(12) United States Patent
Cronin

(10) Patent No.: US 12,441,212 B2
(45) Date of Patent: Oct. 14, 2025

(54) SUPERCAPACITOR TO ELECTROCHEMICAL HYBRID SYSTEM WITH A SUPERCAPACITOR BATTERY MANAGEMENT CAPABILITY

(71) Applicant: SUSTAINABLE ENERGY TECHNOLOGIES, INC., Wilmington, DE (US)

(72) Inventor: John Cronin, Wilmington, DE (US)

(73) Assignee: Sustainable Energy Technologies, Inc., Wilmington, DE (US)

( * ) Notice: Subject to any disclaimer, the term of this patent is extended or adjusted under 35 U.S.C. 154(b) by 275 days.

(21) Appl. No.: 18/090,277

(22) Filed: Dec. 28, 2022

(65) Prior Publication Data

US 2023/0234472 A1 Jul. 27, 2023

Related U.S. Application Data

(60) Provisional application No. 63/295,485, filed on Dec. 30, 2021.

(51) Int. Cl.
*B60L 58/18* (2019.01)
*H02J 7/00* (2006.01)
*H02J 7/34* (2006.01)

(52) U.S. Cl.
CPC ............ *B60L 58/18* (2019.02); *H02J 7/0063* (2013.01); *H02J 7/345* (2013.01); *B60L 2240/547* (2013.01); *B60L 2240/549* (2013.01)

(58) Field of Classification Search
CPC ............... B60L 58/18; B60L 2240/547; B60L 2240/549; H02J 7/0063; H02J 7/345
See application file for complete search history.

(56) References Cited

U.S. PATENT DOCUMENTS

| | | | |
|---|---|---|---|
| 5,642,270 A | 6/1997 | Green et al. | |
| 6,068,078 A | * 5/2000 | Rau ...................... | B62D 5/0457 318/489 |

(Continued)

FOREIGN PATENT DOCUMENTS

| | | |
|---|---|---|
| CN | 103192724 | 7/2013 |
| CN | 104057901 | 9/2014 |

(Continued)

OTHER PUBLICATIONS

T. Mesbahi, P. et al., "Advanced Model of Hybrid Energy Storage System Integrating Lithium-Ion Battery and Supercapacitor for Electric Vehicle Applications," in IEEE Transactions on Industrial Electronics, vol. 68, No. 5, pp. 3962-3972, May 2021.*

(Continued)

Primary Examiner — Gertrude Arthur Jeanglaude
(74) Attorney, Agent, or Firm — Polsinelli LLP

(57) ABSTRACT

Disclosed herein are systems and methods for energy management. A system, such as a vehicle, includes a plurality of energy storage units that include a supercapacitor and an electrochemical battery. The system includes plurality of energy storage units including a supercapacitor and an electrochemical battery, the supercapacitor comprising a plurality of selectable power sources, and an adder module including a processor. The processor is configured to execute instructions to selectively connect the supercapacitor or the electrochemical battery to an electric drivetrain to propel the vehicle. The processor may be configured to measure the selectable power sources and determine a set of the selectable power sources to connect to the system.

20 Claims, 9 Drawing Sheets

(56) References Cited

U.S. PATENT DOCUMENTS

| | | |
|---|---|---|
| 7,548,894 B2 | 6/2009 | Fuji |
| 8,080,971 B2 | 12/2011 | Bose et al. |
| 8,881,832 B2 | 11/2014 | McMillon et al. |
| 8,950,662 B2 | 2/2015 | Soborski |
| 9,053,870 B2 | 6/2015 | Yu et al. |
| 9,145,760 B2 | 9/2015 | McMillon et al. |
| 9,169,719 B2 | 10/2015 | McMillon et al. |
| 9,233,860 B2 | 1/2016 | Liu et al. |
| 9,298,239 B2 | 3/2016 | Ishii et al. |
| 9,318,271 B2 | 4/2016 | Fletcher et al. |
| 9,379,546 B2 | 6/2016 | Li |
| 9,519,942 B2 | 12/2016 | Soborski |
| 9,940,572 B2 | 4/2018 | Soborski |
| 10,061,958 B2 | 8/2018 | Voigt et al. |
| 10,173,663 B1 | 1/2019 | Combs |
| 10,235,597 B2 | 3/2019 | Voigt et al. |
| 10,290,912 B2 | 5/2019 | Jiang et al. |
| 10,380,601 B2 | 8/2019 | Soborski |
| 10,700,597 B1 | 6/2020 | Eckhardt et al. |
| 10,734,674 B2 | 8/2020 | Meshcheryakov et al. |
| 11,407,327 B1 | 8/2022 | Kohn et al. |
| 12,224,611 B2 | 2/2025 | Cronin |
| 12,296,717 B2 | 5/2025 | Cronin |
| 2005/0137764 A1 | 6/2005 | Alvarez-Troncoso et al. |
| 2006/0250902 A1 | 11/2006 | Bender et al. |
| 2007/0029986 A1 | 2/2007 | Nakamura et al. |
| 2007/0258188 A1 | 11/2007 | Shiue et al. |
| 2008/0161070 A1 | 7/2008 | Lee et al. |
| 2010/0258369 A1 | 10/2010 | Ranier et al. |
| 2010/0315046 A1 | 12/2010 | Trainor et al. |
| 2011/0060565 A1 | 3/2011 | Sciarretta et al. |
| 2012/0025614 A1 | 2/2012 | Taimela et al. |
| 2012/0098496 A1 | 4/2012 | Jeong et al. |
| 2012/0109408 A1 | 5/2012 | Siy et al. |
| 2012/0248870 A1 | 10/2012 | Coleman et al. |
| 2012/0326668 A1* | 12/2012 | Ballatine ............ B60L 53/20 320/109 |
| 2013/0106341 A1 | 5/2013 | Eaton et al. |
| 2013/0264875 A1 | 10/2013 | Kaminsky et al. |
| 2013/0271091 A1 | 10/2013 | Borkar |
| 2013/0307489 A1 | 11/2013 | Kusch et al. |
| 2013/0311529 A1 | 11/2013 | Liu et al. |
| 2014/0266059 A1 | 9/2014 | Li et al. |
| 2015/0042157 A1 | 2/2015 | Chen et al. |
| 2015/0047844 A1 | 2/2015 | McMillon et al. |
| 2015/0069033 A1 | 3/2015 | Stockton et al. |
| 2015/0210173 A1 | 7/2015 | Funabashi |
| 2015/0303726 A1 | 10/2015 | Lei |
| 2016/0013654 A1 | 1/2016 | Saha |
| 2016/0156005 A1 | 6/2016 | Elliot et al. |
| 2016/0176298 A1 | 6/2016 | Watson et al. |
| 2016/0283842 A1 | 9/2016 | Pescianschi |
| 2017/0076116 A1 | 3/2017 | Chen et al. |
| 2017/0203850 A1* | 7/2017 | Wang ............ H02J 7/34 |
| 2017/0267105 A1 | 9/2017 | Fratelli et al. |
| 2017/0373513 A1 | 12/2017 | Aronov et al. |
| 2018/0012197 A1* | 1/2018 | Ricci ............ G07C 5/0808 |
| 2018/0050602 A1 | 2/2018 | Aronov |
| 2018/0123370 A1 | 5/2018 | Schartner |
| 2018/0154779 A1 | 6/2018 | Chol et al. |
| 2018/0201142 A1* | 7/2018 | Galin ............ H02J 3/14 |
| 2018/0326861 A1 | 11/2018 | Poirier |
| 2019/0061541 A1 | 2/2019 | Penilla et al. |
| 2019/0097362 A1 | 3/2019 | Haba et al. |
| 2019/0180949 A1 | 6/2019 | Liu et al. |
| 2020/0039356 A1 | 2/2020 | Montione |
| 2020/0039454 A1 | 2/2020 | Hsieh et al. |
| 2020/0164763 A1 | 5/2020 | Holme |
| 2020/0271725 A1 | 8/2020 | Herring et al. |
| 2020/0365336 A1 | 11/2020 | Luo et al. |
| 2020/0376968 A1 | 12/2020 | Wang et al. |
| 2020/0398696 A1 | 12/2020 | Stafl |
| 2021/0126509 A1 | 4/2021 | Macaluso |
| 2021/0175025 A1 | 6/2021 | Zhou et al. |
| 2021/0203177 A1 | 7/2021 | Peng |
| 2021/0221247 A1 | 7/2021 | Daniel et al. |
| 2021/0291964 A1 | 9/2021 | Gilbert |
| 2021/0319152 A1 | 10/2021 | Couture et al. |
| 2021/0349155 A1 | 11/2021 | Srinivasan et al. |
| 2021/0376614 A1 | 12/2021 | Yang et al. |
| 2022/0190629 A1 | 6/2022 | Varigonda et al. |
| 2023/0107732 A1 | 4/2023 | Yamamoto et al. |
| 2023/0127005 A1 | 4/2023 | Chen et al. |
| 2023/0187954 A1 | 6/2023 | Cronin |
| 2023/0191949 A1 | 6/2023 | Cronin |
| 2023/0211674 A1 | 7/2023 | Cronin |
| 2023/0211675 A1 | 7/2023 | Cronin |
| 2023/0211676 A1 | 7/2023 | Cronin |
| 2023/0211677 A1 | 7/2023 | Cronin |
| 2023/0211691 A1 | 7/2023 | Cronin |
| 2023/0213593 A1 | 7/2023 | Cronin |
| 2023/0216323 A1 | 7/2023 | Cronin |
| 2023/0216330 A1 | 7/2023 | Cronin |
| 2023/0216331 A1 | 7/2023 | Cronin |
| 2023/0234472 A1 | 7/2023 | Cronin |
| 2023/0241984 A1 | 8/2023 | Cronin |
| 2023/0378752 A1 | 11/2023 | Chen |
| 2025/0253693 A1 | 8/2025 | Cronin |
| 2025/0269765 A1 | 8/2025 | Cronin |

FOREIGN PATENT DOCUMENTS

| | | |
|---|---|---|
| CN | 106252096 | 12/2016 |
| CN | 106252099 | 12/2016 |
| CN | 207453897 | 6/2018 |
| CN | 111216568 | 6/2020 |
| CN | 111490595 | 8/2020 |
| CN | 112290622 | 1/2021 |
| CN | 109983419 | 7/2022 |
| EP | 2 278 677 | 1/2011 |
| IN | 202041011809 | 2/2020 |
| KR | 102247165 | 4/2021 |
| WO | WO 2014/107151 | 7/2014 |
| WO | WO 2018/041095 | 3/2018 |
| WO | WO 2018/106799 | 6/2018 |
| WO | 2020251854 A1 | 12/2020 |
| WO | WO 2023/114276 | 6/2023 |
| WO | WO 2023/114429 | 6/2023 |
| WO | 2023129520 A1 | 7/2023 |
| WO | 2023129521 A2 | 7/2023 |
| WO | 2023129522 A1 | 7/2023 |
| WO | 2023129614 A1 | 7/2023 |
| WO | 2023129616 A1 | 7/2023 |
| WO | 2023129695 A1 | 7/2023 |
| WO | 2023129718 A1 | 7/2023 |
| WO | 2023129724 A1 | 7/2023 |
| WO | 2023129741 A1 | 7/2023 |
| WO | WO 2023/129507 | 7/2023 |
| WO | WO 2023/150226 | 8/2023 |

OTHER PUBLICATIONS

"200-MHz 16×16 Video Crosspoint Switch IC," Analogue Dialogue, Apr. 1997, vol. 31, No. 2, 25 pages; https://www.analog.com/en/analog-dialogue/articles/200-mhz-16x16-video-crosspoint-switch-ic.html.

"8×8 Analog Crosspoint Switches Analog & Digital Crosspoint ICs," Mouser Electronics, [Downloaded on Internet: Feb. 21, 2023], 5 pages, https://www.mouser.com/c/semiconductors/communication-networking-ics/analog-digital-crosspoint-ics.

Camara et al., "Polynomial Control Method of DC/DC Converters for DC-Bus Voltage and Currents Management-Battery and Supercapacitors," IEEE Transaction on Power Electronics, vol. 27, No. 3 (Mar. 2012): 1455-1467, DOI: 10.1109/TPEL.2011.2164581.

Crossbar Switch - Wikipedia, [Downloaded from Internet: Feb. 21, 2023], 7 pages; https://en.wikipedia.org/wiki/Crossbar_switch.

Danila et al., Elena; "Dynamic Modelling of Supercapacitor Using Artificial Neural Network Technique," International Conference and Exposition on Electrical and Power Engineering, Oct. 2014, DOI: 10.1109/ICEPE.2014.6969988 and https://www.researchgate.net/publication/270888480_Dynamic_Modelling_of_Supercapacitor_Using_Artificial_Neural_Network_Technique.

(56) References Cited

OTHER PUBLICATIONS

"Details, datasheet, quote on part No. BQ24640RVAR—High Efficiency Synchronous Switch-Mode Battery Charge Controller for Super Capacitors," Texas Instruments, SLUSA44A—Mar. 2010—Revised Jul. 2015, 31 pages, https://www.digchip.com/datasheets/%203258066-bq24640rvar.html.
"Digital Crosspoint Switches," MicroSemi Corp. (Aliso Viego, CA), [Downloaded from Internet Feb. 21, 2023], 2 pages, https://www.microsemi.com/product-directory/signal-integrity/3579-digital-crosspoint-switches.
Eddahech et al., Akram; "Modeling and adaptive control for supercapacitor in automotive applications based on artificial neural networks," Electric Power Systems Research, vol. 106 (Jan. 2014): 134-141, https://www.sciencedirect.com/science/article/abs/pii/S0378779613002265.
Ge et al., Yuru; "How to measure and report the capacity of electrochemical double layers, supercapacitors, and their electrode materials," Journal of Solid State Electrochemistry, vol. 24 (2020): 3215-3230, https://link.springer.com/article/10.1007/s10008-020-04804-x.
Haddoun, Abdelhakim; "Modeling, Analysis, and Neural Network Control of an EV Electrical Differential," IEEE Transactions on Industrial Electronics, vol. 55, No. 6 (Jun. 2008): 2286-94, https://www.researchgate.net/publication/3219993.
Lin et al., Tianquan; "Nitrogen-doped mesoporous carbon of extraordinary capacitance for electrochemicalenergy storage," Science (new series), vol. 350, No. 6267 (Dec. 18, 2015): 1508-1513https://www.jstor.org/stable/24741499.
Marie-Francoise et al., Jean-Noel; "Supercapacitor modeling with Artificial Neural Network (ANN)," 2004, https://www.osti.gov/etdeweb/servlets/purl/20823689.
"Micrel™ 2.5V/3.3V 3.0 GHz Dual 2×2 CML Crosspoint Switch w/ Internal Termination, SuperLite™ SY55858U," Nov. 2005, 8 pages, http://ww1.microchip.com/downloads/en/DeviceDoc/sy55858u.pdf.
Surewaard et al., Erik; "A Comparison of Different Methods for Battery and Supercapacitor Modeling," SAE Transactions, Journal of Engines, vol. 112, Section 3 (2003): 1851-1859, https://www.jstor.org/stable/44741399.
"Testing Super-Capacitors, Part 1: CV, EIS, and Leakage Current," Apr. 16, 2015, 11 pages, https://www.gamry.com/assets/Uploads/Super-capacitors-part-1-rev-2.pdf.
"Testing Electrochemical Capacitors Part 2—Cyclic Charge Discharge and Stacks," Nov. 14, 2011, 11 pages; https://www.gamry.com/assets/Application-Notes/Testing-Super-Capacitors-Pt2.pdf.
"Understanding Tree and Crosspoint Matrix Architectures." Pickering Test, [Downloaded from Internet: Feb. 21, 2023], 7 pages, https://www.pickeringtest.com/en-us/kb/hardware-topics/switching-architectures/understanding-tree-and-crosspoint-matrix-architectures.
International PCT Application No. PCT/US22/54026 International Search Report mailed Apr. 18, 2023 (7 pages).
International PCT Application No. PCT/US22/54184 International Search Report mailed Apr. 18, 2023 (7 pages).
International PCT Application No. PCT/US22/54029 International Search Report mailed Apr. 18, 2023 (6 pages).
International PCT Application No. PCT/US22/54030 International Search Report mailed May 30, 2023 (10 pages).
International PCT Application No. PCT/US22/54357 International Search Report mailed Apr. 5, 2023 (21 pages).
International PCT Application No. PCT/US22/54388 International Search Report mailed Apr. 5, 2023 (19 pages).
International Application No. PCT/US22/54186 International Search Report mailed Mar. 20, 2023 (11 pages).
International Application No. PCT/US22/54320 International Search Report mailed Apr. 7, 2023 (9 pages).
International Application No. PCT/US22/54348 International Search Report mailed Apr. 7, 2023 (9 pages).
International Application No. PCT/US23/12215 International Search Report mailed May 9, 2023 (6 pages).
Machine Translation CN103192724 reference of record (Year: 2020).
Machine Translation CN111216568 reference of record (Year: 2020).
PCT Application No. PCT/US22/52805, International Search Report and Written Opinion dated Apr. 13, 2023.
PCT Application No. PCT/US22/53060, International Search Report and Written Opinion dated Apr. 4, 2023.
PCT Application No. PCT/US22/53955, International Search Report and Written Opinion dated Apr. 12, 2023.
U.S. Appl. No. 18/081,043, Office Action dated Mar. 13, 2024.
PCT Application No. PCT/US22/52805, International Preliminary Report on Patentability dated Jun. 27, 2024.
PCT Application No. PCT/US22/53060, International Preliminary Report on Patentability dated Jun. 27, 2024.
PCT Application No. PCT/US22/53955, International Preliminary Report on Patentability dated Jul. 11, 2024.
PCT Application No. PCT/US22/54026, International Preliminary Report on Patentability dated Jul. 11, 2024.
PCT Application No. PCT/US22/54184, International Preliminary Report on Patentability dated Jul. 11, 2024.
PCT Application No. PCT/US22/54029, International Preliminary Report on Patentability dated Jul. 11, 2024.
PCT Application No. PCT/US22/54030, International Preliminary Report on Patentability dated Jul. 11, 2024.
PCT Application No. PCT/US22/54357, International Preliminary Report on Patentability dated Jul. 11, 2024.
PCT Application No. PCT/US22/54388, International Preliminary Report on Patentability dated Jul. 11, 2024.
PCT Application No. PCT/US22/54186, International Preliminary Report on Patentability dated Jul. 11, 2024.
PCT Application No. PCT/US22/54320, International Preliminary Report on Patentability dated Jul. 11, 2024.
PCT Application No. PCT/US22/54348, International Preliminary Report on Patentability dated Jul. 11, 2024.
PCT Application No. PCT/US23/12215, International Preliminary Report on Patentability dated Aug. 15, 2024.
U.S. Appl. No. 18/082,425, Office Action dated May 21, 2024.
U.S. Appl. No. 18/091,756, Office Action dated Sep. 4, 2025.
U.S. Appl. No. 18/088,679, Office Action dated May 19, 2025.
U.S. Appl. No. 18/105,108, Office Action dated May 29, 2025.

* cited by examiner

SUPERCAPACITOR TO ELECTROCHEMICAL HYBRID SYSTEM WITH A SUPERCAPACITOR BATTERY MANAGEMENT CAPABILITY

CROSS-REFERENCE TO RELATED APPLICATIONS

This application claims the benefit of U.S. Provisional Application No. 63/295,485, filed Dec. 30, 2021, titled "SUPERCAPACITOR TO ELECTROCHEMICAL HYBRID SYSTEM WITH A SUPERCAPACITOR BATTERY MANAGEMENT CAPABILITY," the disclosure of which is incorporated herein by reference in its entirety.

FIELD OF THE DISCLOSURE

The present disclosure is generally related to the field of use is SuperCapacitor to Electrochemical Hybrid System with a Supercapacitor Battery Management Capability system.

BACKGROUND

Some vehicles, such as electric vehicles or hybrid vehicles, include energy storage units such as batteries to power components and subsystems of the vehicles. For instance, in some vehicles, power from the energy storage units is used to power propulsion mechanisms, such as motors and/or engines, that propel the vehicle. Such a vehicle's effective driving range can be limited by how much power can be provided by its energy storage units. A supercapacitor is a type of capacitor that can be used as an energy storage unit.

SUMMARY

Disclosed herein are systems and methods for energy management. A system, such as a vehicle, includes a plurality of energy storage units that include a supercapacitor and an electrochemical battery. The supercapacitor includes a plurality of selectable power sources that can be combined with adder module to provide power to the system. In some aspects, the adder module includes a processor configured to selectively connect the supercapacitor or the electrochemical battery to an electric drivetrain to propel the vehicle. The processor is configured to, in response to detecting connection of the supercapacitor to the electric drivetrain, output a signal to connect a first subset of the plurality of selectable power sources to the electric drivetrain. A second set of the plurality of selectable power sources remain disconnected from the electric drivetrain.

In an illustrative example, the processor is configured to determine an amount of power to reserve and identify a quantity of selectable power sources in the second set based on the amount of power to reserve. A quantity of the first set of the plurality of selectable power sources is a fixed number based on a reserved amount of power. In some examples, the processor is configured to, in response to detecting connection of the supercapacitor to the electric drivetrain, measure each selectable power source the plurality of selectable power sources of the supercapacitor. The processor is configured to control the selectable power sources to couple to the system to increase battery life of the supercapacitor and electrochemical battery.

In another illustrative example, a vehicle includes an energy management system. The vehicle may include a plurality of energy storage units including a supercapacitor and an electrochemical battery, the supercapacitor comprising a plurality of selectable power sources. The vehicle may also include an adder module including a processor configured to selectively connect at least one of the supercapacitor and the electrochemical battery to the vehicle. In some cases, the processor executes a machine learning model based on recorded information and predetermined weights to selectively output a signal to connect the supercapacitor or the electrochemical battery to an electric drivetrain to propel the vehicle.

BRIEF DESCRIPTION OF THE DRAWINGS

The accompanying drawings illustrate various systems, methods, and other aspects. Any person with ordinary art skills will appreciate that the illustrated element boundaries (e.g., boxes, groups of boxes, or other shapes) in the figures represent an example of the boundaries. It may be understood that, in some examples, one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Figure 1:
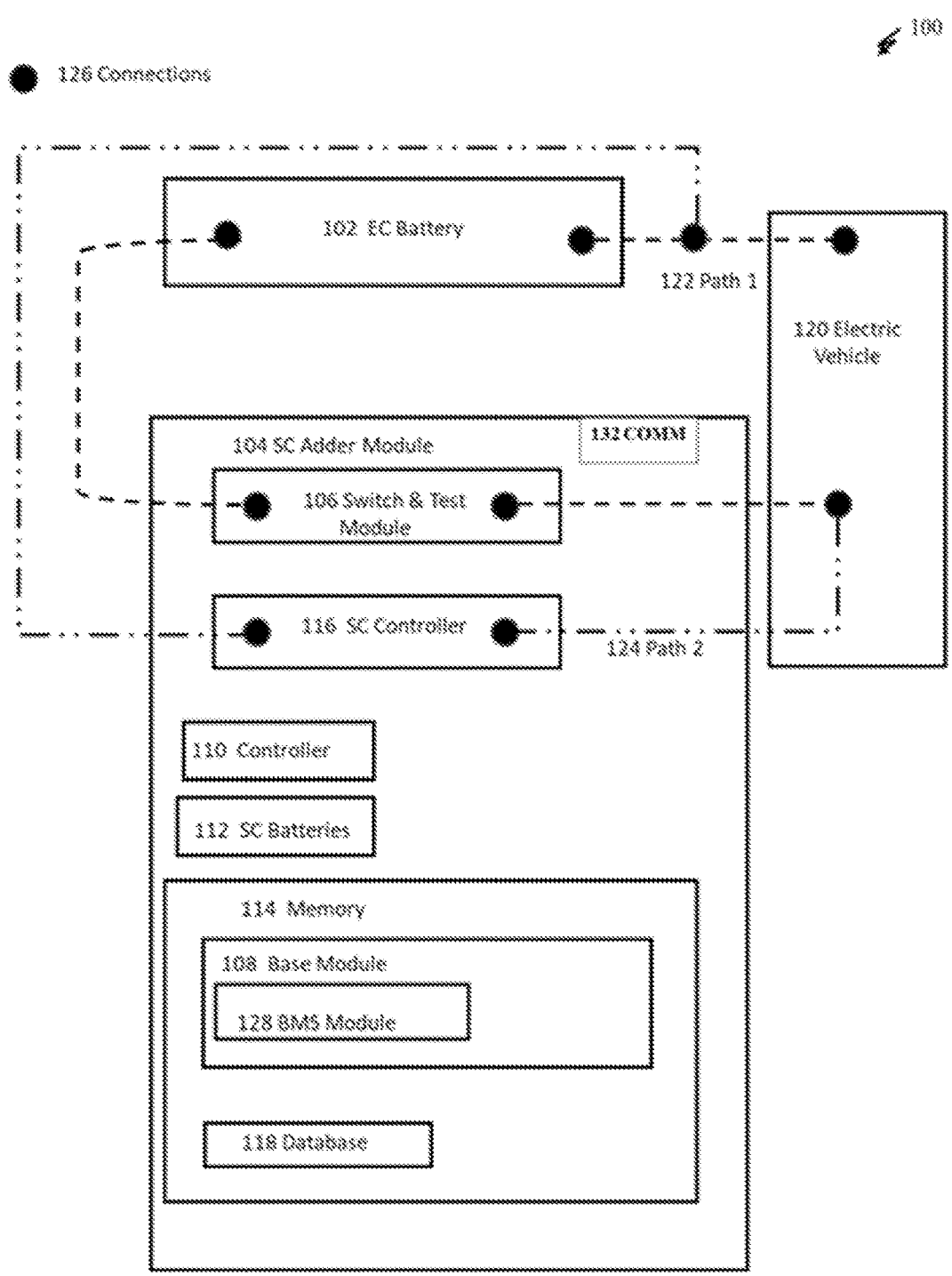
FIG. 1 is a block diagram illustrating an architecture of an energy management system, according to some examples.

Aspects of the present invention are disclosed in the following description and related figures directed to specific aspects of the disclosure. Those of ordinary skill in the art will recognize that alternate embodiments may be devised without departing from the spirit or scope of the claims. Additionally, known elements of aspects of the invention will not be described in detail or will be omitted so as not to obscure the relevant details of the invention.

Aspects of the present invention are disclosed in the following description and related figures directed to specific embodiments of the invention. Those of ordinary skill in the art will recognize that alternate embodiments may be devised without departing from the claims' spirit or scope. Additionally, well-known elements of exemplary embodiments of the invention will not be described in detail or will be omitted so as not to obscure the relevant details of the invention As used herein, the word exemplary means serving as an example, instance, or illustration. The embodiments described herein are not limiting but rather are exemplary only. It should be understood that the described embodiments are not necessarily to be construed as preferred or advantageous over other embodiments. Moreover, the terms embodiments of the invention, embodiments, or invention do not require that all embodiments include the discussed feature, advantage, or mode of operation.

Further, many of the embodiments described herein are described in sequences of actions to be performed by, for example, elements of a computing device. It should be recognized by those skilled in the art that specific circuits can perform the various sequence of actions described herein (e.g., application-specific integrated circuits (ASICs)) and/or by program instructions executed by at least one processor. Additionally, the sequence of actions described herein can be embodied entirely within any form of computer-readable storage medium. The execution of the sequence of actions enables the processor to perform the functionality described herein. Thus, the various aspects of the present invention may be embodied in several different forms, all of which have been contemplated to be within the scope of the claimed subject matter. In addition, for each of the embodiments described herein, the corresponding form of any such embodiments may be described herein as, for example, a computer configured to perform the described action.

Disclosed herein are systems and methods for energy management. A system (e.g., a vehicle) includes energy storage units that include a supercapacitor and an electrochemical battery. The system includes a plurality of energy storage units that include a supercapacitor and an electrochemical battery. The system includes plurality of energy storage units including a supercapacitor and an electrochemical battery, the supercapacitor comprising a plurality of selectable power sources, and an adder module including a processor. The processor is configured to execute instructions to selectively connect the supercapacitor or the electrochemical battery to an electric drivetrain to propel the vehicle. The processor may be configured to measure the selectable power sources and determine a set of the selectable power sources to connect to the system.

Energy Storage Unit (ESU):

The ESU is a device that can store and deliver charge. It may comprise one or more power packs, which may comprise supercapacitors. The energy storage module may also comprise batteries, hybrid systems, fuel cells, etc. Capacitance provided in the components of the ESU may be in the form of electrostatic capacitance, pseudocapacitance, electrolytic capacitance, electronic double-layer capacitance, and electrochemical capacitance, and a combination thereof, such as both electrostatic double-layer capacitance and electrochemical pseudocapacitance, as may occur in supercapacitors. The ESU may be associated with or comprise control hardware and software with suitable sensors, as needed, for an energy control system (ECS) to manage any of the following: temperature control, discharging of the ESU whether collectively or of any of its components, charging of the ESU whether collectively or of any of its components, maintenance, interaction with batteries, battery emulation, communication with other devices, including devices that are directly connected, adjacent, or remotely such as by wireless communication, etc. In some aspects, the ESU may be portable and provided in a casing containing at least some components of the energy control system (ECS) and features such as communication systems, a display interface, etc.

The term supercapacitor as used herein can also refer to an ultracapacitor, which is an electrical component capable of holding hundreds of times more electrical charge quantity than a standard capacitor. This characteristic makes ultracapacitors useful in devices that require relatively little current and low voltage. In some situations, an ultracapacitor can take the place of a rechargeable low-voltage electrochemical battery. In some examples, the terms supercapacitor or ultracapacitor as used herein can also refer to other types of capacitors.

Energy Control System (ECS)

The energy control system (ECS) combines hardware and software that manages various aspects of the ESU, including its energy to the device. The ECS regulates the energy storage unit (ESU) to control discharging, charging, and other features as desired, such as temperature, safety, efficiency, etc. The ESU may be adapted to give the ECS individual control over each power pack or optionally over each supercapacitor or grouped supercapacitor unit to tap the available power of individual supercapacitors efficiently and to properly charge individual supercapacitors rather than merely providing a single level of charge for the ESU as a whole that may be too little or too much for individual supercapacitors or their power packs.

The ECS may comprise or be operatively associated with a processor, a memory comprising code for the controller, a database, and communication tools such as a bus or wireless capabilities for interacting with an interface or other elements or otherwise providing information, information requests, or commands. The ECS may interact with individual power packs or supercapacitors through a crossbar switch or other matrix systems. Further, the ECS may obtain information from individual power packs or their supercapacitors through similar switching mechanisms or direct wiring in which, for example, one or more of a voltage detection circuit, an amperage detection circuit, a temperature sensor, and other sensors or devices may be used to provide details on the level of charge and performance of the individual power pack or supercapacitor.

The ECS may comprise one or more modules that the processor can execute or govern according to code stored in a memory such as a chip, a hard drive, a cloud-based source, or another computer-readable medium.

The ECS may therefore manage any or all of the following: temperature control, discharging of the ESU whether collectively or of any of its components, charging of the ESU whether collectively or of any of its components, maintenance, interaction with batteries, or battery emulation, and communication with other devices, including devices that are directly connected, adjacent, or remotely such as by wireless communication.

The ECS may comprise one or more energy source modules that govern specific energy storage devices, such as a supercapacitor module for governing supercapacitors and a lithium module for governing lithium batteries. A lead-acid module for governing lead-acid batteries and a hybrid module for governing the combined cooperative use of a supercapacitor and a battery. Each of the energy storage modules may comprise software encoding algorithms for control such as for discharge or charging or managing individual energy sources, and may comprise or be operationally associated with hardware for redistributing charge among the energy sources to improve the efficiency of the ESU, for monitoring charge via charge measurement systems such as circuits for determining the charge state of the respective energy sources, etc., and may comprise or be operationally associated with devices for receiving and sending information to and from the ECS or its other modules, etc. The energy source modules may also cooperate with a charging module responsible for guiding the charging of the overall ESU to ensure a properly balanced charge and a discharge module that guides the efficient discharging of the ESU during use which may also seek to provide proper balance in the discharging of the energy sources.

The ECS may further comprise a dynamic module for managing changing requirements in power supplied. In some aspects, the dynamic module comprises anticipatory algorithms that seek to predict upcoming changes in power demand and adjust the state of the ECS to be ready to handle the change more effectively. For example, in one case, the ECS may communicate with a GPS and terrain map for the route being taken by the electric vehicle and recognize that a steep hill will soon be encountered. The ECS may anticipate the need to increase torque and thus the delivered electrical power from the ESU and thus activate additional power packs if only some are in use or otherwise increase the draw from the power packs to handle the change in slope efficiently to achieve desired objectives such as maintaining speed, reducing the need to shift gears on a hill, or reducing the risk of stalling or other problems.

The ECS may also comprise a communication module and an associated configuration system to properly configure the ECS to communicate with the interface or other aspects of the vehicle and communicate with central systems or other vehicles when desired. In such cases, a fleet of vehicles may be effectively monitored and managed to improve energy efficiency and track the performance of vehicles and their ESUs, thereby providing information that may assist with maintenance protocols. Such communication may occur wirelessly or through the cloud via a network interface, share information with various central databases, or access information from databases to assist with the vehicle's operation and the optimization of the ESU, for which historical data may be available in a database.

Databases of use with the ECS include databases on the charge and discharge behavior of the energy sources in the ESU to optimize both charging and discharging in use based on known characteristics, databases of topographical and other information for a route to be taken by the electric vehicle or an operation to be performed by another device employing the ESU, wherein the database provides guidance on what power demands are to be expected in advance to support anticipatory power management wherein the status of energy sources. The available charge is prepared in time to deliver the needed power proactively. Charging databases may also help describe the characteristics of an external power source used to charge the ESU. The external charge characteristics can prepare for impedance matching or other measures needed to handle a new input source to charge the ESU. With that data, the external power can be received with reduced losses and reduced risk of damaging elements in the ESU by overcharge, an excessive ripple in the current, etc.

Beyond relying on static information in databases, in some aspects, the controller is adapted to perform machine learning and to learn from situations faced constantly. In related aspects, the processor and the associated software form a "smart" controller based on machine learning or artificial intelligence adapted to handle a wide range of input and a wide range of operational demands.

ESU Hardware

Charging and Discharging Hardware

The charging and discharging hardware comprises the wiring, switches, charge detection circuits, current detection circuits, and other devices for proper control of charge applied to the power packs or the batteries or other energy storage units and temperature-control devices such as active cooling equipment and other safety devices. Active cooling devices (not shown) may include fans, circulating heat transfer fluids that pass through tubing or, in some cases, surround or immerse the power packs, thermoelectric cooling such as Peltier effect coolers, etc.

To charge and discharge an individual unit among the power packs to optimize the overall efficiency of the ESU, methods are needed to select one or more of many units from what may be a three-dimensional or two-dimensional array of connectors to the individual units. Any suitable methods and devices may be used for such operations, including crosspoint switches or other matrix switching tools. Crosspoint switches and matrix switches are means of selectively connecting specific lines among many possibilities, such as an array of X lines (X1, X2, X3, etc.) and an array of Y lines (Y1, Y2, Y3, etc.) that may respectively have access to the negative or positive electrodes or terminals of the individual units among the power packs as well as the batteries or other energy storage units. SPST (Single-Pole Single-Throw) relays, for example, may be used. By applying a charge to individual supercapacitors within power packs or to individual power packs within the ESU, a charge can be applied directly to where it is needed, and a supercapacitor or power pack can be charged to an optimum level independently of other power packs or supercapacitors.

Configuration Hardware

The configuration hardware comprises the switches, wiring, and other devices to transform the electrical configuration of the power packs between series and parallel configurations, such as that a matrix of power packs may be configured to be in series, in parallel, or some combination thereof. For example, a 12×6 array of power packs may have four groups in series, with each group having 3×6 power packs in parallel. A command can modify the configuration from the configuration module, which then causes the configuration hardware to make the change at an appropriate time (e.g., when the device is not in use).

Sensors

The sensors may include thermocouples, thermistors, or other devices associated with temperature measurement such as IR cameras, etc., as well as strain gauges, pressure gauges, load cells, accelerometers, inclinometers, velocimeters, chemical sensors, photoelectric cells, cameras, etc., that can measure the status of the power packs or batteries or other energy storage units or other characteristics of the ESU or the device as described more fully hereafter. The sensors may comprise sensors physically contained in or on the ESU or sensors mounted elsewhere, such as engine gauges in electronic communication with the ECS or its associated ESC.

Batteries and Other Energy Sources

The ESU may be capable of charging or supplementing the power provided from the batteries or other energy storage units, including chemical and nonchemical batteries, such as but not limited to lithium batteries (including those with titanate, cobalt oxide, iron phosphate, iron disulfide, carbon monofluoride, manganese dioxide or oxide, nickel cobalt aluminum oxides, nickel manganese cobalt oxide, etc.), lead-acid batteries, alkaline or rechargeable alkaline batteries, nickel-cadmium batteries, nickel-zinc batteries, nickel-iron batteries, nickel-hydrogen batteries, nickel-metal-hydride batteries, zinc-carbon batteries, mercury cell batteries, silver oxide batteries, sodium-sulfur batteries, redox flow batteries, supercapacitor batteries, and combinations or hybrids thereof.

Power Input/Output Interface

The ESU also comprises or is associated with a power input/output interface 152 that can receive charge from a device (or a plurality of devices in some cases) such as the grid or regenerative power sources in an electric vehicle (not shown) and can deliver charge to a device such as an electric vehicle (not shown). The power input/output interface may comprise one or more inverters, charge converters, or other circuits and devices to convert the current to the proper type (e.g., AC or DC) and voltage or amperage for either supplying power to or receiving power from the device it is connected to. Bidirectional DC-DC converters may also be applied.

The power input/output interface may be adapted to receive power from various power sources, such as via two-phase or three-phase power, DC power, etc. It may receive or provide power by wires, inductively, or other proper means. Converters, transformers, rectifiers, and the like may be employed as needed. The power received may be relatively steady from the grid or other sources at voltages such as 110V, 120V, 220V, 240V, etc., or from highly variable sources such as solar or wind power amperage or voltage vary. DC sources may be, by way of example, from 1V to 0V or higher, such as from 4V to 200V, 5V to 120V, 6V to 12V, 2V to 50V, 3V to 24V, or nominal voltages of about 4, 6, 12, 18, 24, 30, or 48 V. Similar ranges may apply to AC sources, but also including from 60V to 300V, from 90V to 250V, from 0V to 240 V, etc., operating at any proper frequency such as 50 Hz, 60 Hz, 120 Hz, etc.

Power received or delivered may be modulated, converted, smoothed, rectified, or transformed in any useful way to better meet the application's needs and the requirements of the device and the ESU. For example, pulse-width modulation (PWM), sometimes called pulse-duration modulation (PDM), may be used to reduce the average power delivered by an electrical signal as it is effectively chopped into discrete parts. Likewise, maximum power point tracking (MPPT) may be employed to keep the load at the right level for the most efficient power transfer.

The power input/out interface may have a plurality of receptacles of receiving power and a plurality of outlets for providing power to one or more devices. AC outlets may include any known outlet standard in North America, various parts of Europe, China, Hong Kong, etc.

Energy Control System (ECS)

The energy storage unit (ESU) is governed or controlled by a novel energy control system (ECS) adapted to optimize at least one of charging, discharging, temperature management, safety, security, maintenance, and anticipatory power delivery. The ECS may communicate with a user interface such as a display interface to assist in control or monitoring of the ESU and also may comprise a processor and a memory. The ECS may interact with the ESU's hardware, such as the charging/discharging hardware and a temperature control system that provides data to the ECS and responds to directions from the ECS to manage the ESU.

The energy control system (ECS) may comprise a processor, a memory, one or more energy source modules, a charge/discharge module, a communication module, a configuration module, a dynamic module, an identifier module, a security module, a safety module, a maintenance module, and a performance module.

ECS Components and Modules

Processor

The processor may comprise one or more microchips or other systems for executing electronic instructions and can provide instructions to regulate the charging and discharging hardware and, when applicable, the configuration hardware or other aspects of the ESU and other aspects of the ECS and its interactions with the device, the cloud, etc. In some cases, a plurality of processors may collaborate, including processors installed with the ESU and processors installed in a vehicle or other device.

Memory

The memory may comprise coding to operate one or more of the ECS and their interactions with other components. It may also comprise information such as databases on any aspect of the operation of the ECS, though additional databases are also available via the cloud. Such databases can include a charging database that describes the charging and discharging characteristics of a plurality or all energy sources (the power packs and the batteries or other energy storage units) to guide charging and discharging operations. Such data may also be included with energy-source-specific data provided by or accessed by the energy source modules.

The memory may be in one or more locations or components such as a memory chip, a hard drive, a cloud-based source, or another computer-readable medium, and maybe in any application form such as flash memory, EPROM, EEPROM, PROM, MROM, etc., or combinations thereof and consolidated (centralized) or distributed forms. The memory may, in whole or part, be a read-only memory (ROM) or random-access memory (RAM), including static RAM (SRAM), dynamic RAM (DRAM), synchronous dynamic RAM (SDRAM), and magneto-resistive RAM (MRAM), etc.

Cloud Resources

The ECS may communicate with other entities via the cloud or other means. Such communication may involve information received from and provided to one or more databases and a message center. The message center can provide alerts to an administrator responsible for the ESU and the electric vehicle or another device. For example, an entity may own a fleet of electric vehicles using ESUs and may wish to receive notifications regarding usage, performance, maintenance issues, and so forth. The message center may also authenticate the ESU or verify its authorization for use in the electric vehicle or other devices (not shown) via interaction with the security module.

Energy Source Modules

The energy source modules may comprise specific modules designed to operate a specific energy source, such as a supercapacitor module, a lithium battery module, a lead-acid battery module, or other modules. Such modules may be associated with a database of performance characteristics (e.g., charge and discharge curves, safety restrictions regarding overcharge, temperature, etc.) that may provide information for use by the safety module and the charge/discharge module, which is used to optimize how each unit within the power packs or batteries or other energy storage units is used both in terms of charging and delivering charge. The charge/discharge module seeks to provide useful work from as much of the charge as possible in the individual power packs while ensuring that individual power packs are fully charged but not damaged by overcharging. The charge/discharge module can assist in directing the charging/discharging hardware, cooperating with the energy source modules. In one aspect, the ESU thus may provide real-time charging and discharging of the plurality of power packs while the electric vehicle is continuously accelerating and decelerating along a path.

Charge/Discharge Module

The charge/discharge module is used to optimize each unit within the power packs, batteries, or other energy storage units to charge and deliver charge. The charge/discharge module seeks to provide useful work from as much of the charge as possible in the individual power packs while ensuring during charging that individual power packs are fully charged but not damaged by overcharging. The charge/discharge module can assist in directing the charging/discharging hardware, cooperating with the energy source modules. In one aspect, the ESU thus may provide real-time charging and discharging of the plurality of power packs while the electric vehicle is continuously accelerating and decelerating along a path.

The charge/discharge module may be configured to charge or discharge each of the plurality of power packs up to a threshold limit. The charge/discharge module may be coupled to the performance, energy storage, and identifier modules. It may communicate with the charging/discharging hardware of the ESU. For example, the threshold limit may be more than 90 percent capacity of each of the plurality of power packs in one aspect.

Dynamic Module

The dynamic module assists in coping with changes in operation, including acceleration, deceleration, stops, changes in slops (uphill or downhill), changes in traction or properties of the road or ground that affect traction and performance, etc., by optimizing the delivery of power or the charging that is taking place for individual power packs or batteries or other energy storage units. In addition to guiding the degree of power provided by or to individual power packs based on the current use of the device and the individual state of the power packs, in some aspects, the dynamic module provides anticipatory management of the ESU by proactively adjusting the charging or discharging states of the power packs such that added power is available as the need arises or slightly in advance (depending on time constants for the ESU and its components, anticipatory changes in status may only be needed for a few seconds (e.g., 5 seconds or less or 2 seconds or less) or perhaps only for 1 second or less such as for 0.5 seconds or less. Still, more extended preparatory changes may be needed in other cases, such as from 3 seconds to 10 seconds, to ensure that adequate power is available when needed but that power is not wasted by changing the power delivery state prematurely. This anticipatory control can involve increasing the current or voltage being delivered. Still, it can also involve increasing the cooling provided by the cooling hardware of the charging and discharging hardware in cooperation with the safety module and when suitable with the charge/discharge module.

The dynamic module may be communicatively coupled to the charge/discharge module. The dynamic module may be configured to determine the charging and discharging status of the plurality of power packs and batteries or other energy storage units in real-time. For example, in one aspect, the dynamic module may help govern bidirectional charge/discharge in real-time. The electric charge may flow from the ESU into the plurality of power packs and batteries or other energy storage units or vice versa.

Configuration Module

The ECS may comprise a configuration module configured to determine any change in the configuration of charged power packs from the charging module. For example, in one aspect, the configuration module may be provided to charge the configuration of the power packs, such as from series to parallel or vice versa. This may occur via communication with the charging/discharging hardware of the ESU.

Identifier Module

The identifier module, described in more detail hereafter, identifies the charging or discharging requirement for each power pack to assist in best meeting the power supply needs of the device. This process may require access to the database information about the individual power packs from the energy source modules (e.g., a supercapacitor module) and information about the current state of the individual power packs provided by the sensors and charge and current detections circuits associated with the charging and discharging hardware, cooperating with the charge/discharge module and, as needed, with the dynamic module and the safety module.

Safety Module

The sensors may communicate with the safety module to determine if the power packs and individual components show excessive local or system temperature signs that might harm the components. In such cases, the safety module interacts with the processor and other features (e.g., data stored in the databases of the cloud or memory pertaining to safe temperature characteristics for the ESU) to cause a change in operation such as decreasing the charging or discharging underway with the portions of the power packs or other units facing excessive temperature. The safety module may also regulate cooling systems that are part of the charging and discharging hardware to proactively increase the cooling of the power packs, batteries, or other energy storage units. Increasing the load on them does not lead to harmful temperature increases.

Thus, the safety module may also interact with the dynamic module in responding to forecasts of system demands in the near future for anticipatory control of the ESU for optimized power delivery. In the interaction with the dynamic module, the safety module may determine that an upcoming episode of high system demand such as imminent climbing of a hill may impose excessive demands on a power pack already operating at elevated temperature, and thus make a proactive recommendation to increase cooling on the at-risk power packs. Other sensors such as strain gauges, pressure gauges, chemical sensors, etc., may be provided to determine if any of the energy storage units in batteries or other energy storage units or the power packs are facing pressure buildup from outgassing, decomposition, corrosion, electrical shorts, unwanted chemical reactions such as an incipient runaway reaction, or other system difficulties. In such cases, the safety module may initiate precautionary or emergency procedures such as a shutdown, electrical isolation of the affected components, warnings to a system administrator via the communication module to the message center, a request for maintenance to the maintenance module.

Maintenance Module

The maintenance module determines when the ESU requires maintenance, either per a predetermined scheduled or when needed due to apparent problems in performance, as may be flagged by the performance module, or in issues about safety as determined by the safety module based on data from sensors or the charging/discharging hardware, and in light of information from the energy sources modules. The maintenance module may cooperate with the communication module to provide relevant information to the display interface and the message center. An administrator or owner may initiate maintenance action in response to the message provided. The maintenance module may also initiate mitigating actions to be taken, such as cooperating with the charge/discharge module to decrease the demand on one or more of the power packs in need of maintenance and may also cooperate with the configuration module to reconfigure the power packs to reduce the demand in components that may be malfunctioning of near to malfunctioning to reduce harm and risk.

Performance Module

The performance module continually monitors the results obtained with individual power packs and the batteries or other energy storage units and stores information as needed in memory and the cloud databases or via messages to the message center. The monitoring is done using the sensors and the charging/discharging hardware, etc. The tracking of performance attributes of the respective energy sources can guide knowledge about the system's health, the capabilities of the components, etc., which can guide decisions about charging and discharging in cooperation with the charge/discharge module. The performance module compares actual performance, such as power density, charge density, time to charge, thermal behavior, etc., to specifications and can then cooperate with the maintenance module to help determine if maintenance or replacement is needed, and alert an administrator via the communication module with a message to the message center about apparent problems in product quality.

Security Module: Security and Anti-Counterfeiting Measures

The security module helps reduce the risk of counterfeit products or theft or misuse of legitimate products associated with the ESU, thus including one or more methods for authenticating the nature of the ESU and authorization to use it with the device in question. Methods of reducing the risk of theft or unauthorized use of an ESU or its respective power packs can include locks integrated with the casing of the ESU that mechanically secure the ESU in the electric vehicle or other devices, wherein a key, a unique fob, a biometric signal such as a fingerprint or voice recognition system, or other security-related credentials or may be required to enable removal of the ESU or even operation thereof.

In another aspect, the ESU comprises a unique identifier (not shown) that can be tracked, allowing a security system to verify that a given ESU is authorized for use with the device, such as an electric vehicle or other devices. For example, the casing of the ESU or one or more power packs therein may have a unique identifier attached, such as an RFID tag with a serial number (an active or passive tag), a holographic tag with unique characteristics equivalent to a serial number or password, nanoparticle markings that convey a unique signal, etc. One good security tool that may be adapted for the security of the ESU is a seemingly ordinary bar code or QR code with unique characteristics not visible to the human eye that cannot be readily copied that essentially allows ordinary QR codes and barcodes to become unique, individual codes by analysis of tiny imperfections in the printing to uniquely and robustly identify every individual product, even if it seems that the same code is printed on every one.

Yet another approach relies at least in part on the unique electronic signature of the ESU and one or more individual power packs or of one or more supercapacitor units therein. The principle will be described relative to an individual power pack but may be adapted to an individual supercapacitor or collectively to the ESU as a whole. When a power pack comprising supercapacitors is charged from a low voltage or relatively discharged state, the electronic response to a given applied voltage depends on many parameters, including microscopic details of the electrode structure such as porosity, pore size distribution, and distribution of coating materials, or details of electrolyte properties, supercapacitor geometry, etc., as well as macroscopic properties such as temperature. At a specified temperature or temperature range and under other suitable macroscopic conditions (e.g., low vibration, etc.), the characteristics of the power pack may then be tested using any suitable tool capable of identifying a signature specific to the individual power pack. Such techniques may include impedance spectroscopy, cyclic voltammetry, etc., measured under conditions such as Cyclic Charge Discharge (CCD), galvanostatic charge/discharge, potentiostatic charge/discharge, and impedance measurements, etc. An electronic signature of time effects (characteristic changes in time of voltage or current, for example, is a response to an applied load of some kind) may be explored for a specified scenario such as charging a 90% discharged power pack to a state of 50% charge, or examining the response to different applied voltages such as −3V to +4V. Voltammograms may be obtained showing, for example, the response of the power pack to different scan rates.

The security module recognizes that the details of supercapacitor response to a specific load or charge/discharge process may vary gradually over time, especially if the supercapacitor has been exposed to excess voltage or other mechanical or electrical stress can be adaptive and recognize and accept change within certain limits. Changes observed in the response characteristics can be used to update a security database or performance database for the ESU so that that future authentication operations will compare the measured behavior profile of the ESU's power pack in question with the updated profile for authentication purposes and for tracking of performance changes over time. Such information may also be shared with the maintenance module, including the maintenance database, which may trigger a request or requirement for service if there are indications of damage pointing to the need for repair or replacement. When a power pack or supercapacitor therein is replaced due to damage, the response profile of the power pack can then be updated in the security database. When such physical changes cause changes to the measured electronic characteristics that exceed a reasonable threshold, the authorization for the use of that ESU may be withdrawn pending further confirmation of authenticity or necessary maintenance.

In another aspect, each ESU and optionally each power pack of the ESU may be associated with a unique identifier registered in a blockchain system, and each "transaction" of the ESU such as each removal from a vehicle, maintenance operations, purchase or change in ownership, and installation into a vehicle or other device can be recorded and tracked. A code, RFID signal, or other identifiers may be read or scanned for each transaction, such that the blockchain record may then be updated. The blockchain record may comprise information about the authorization state of the product, such as information on what vehicle or vehicles or products the ESU is authorized for, or an identifier associated with the authorized user may be provided, which can be verified or authenticated when the ESU is installed in a new setting or when a transaction occurs. The authorization record may be updated at any time, including when a transaction occurs. The vendor may provide mechanisms to resolve disputes regarding authorization status or other questions.

In some aspects, such as in military or government operation, the ESU may comprise an internal "kill switch" or other inactivation devices that authorities can remotely activate in the event of a crime, unauthorized use, or violation of a contract. Alternatively, an electric vehicle or other devices may be adapted to reject the installation of an ESU that is not authorized for use in the vehicle or device.

Communication Module

The communication module can govern communications between the ECS and the outside world, including communications through the cloud, such as making queries and receiving data from various external databases or sending messages to a message center where they may be processed and archived by an administrator, a device owner, the device user, the ESU owner, or automated systems. In some aspects, the communication module may also oversee communication between modules or between the ESU and the ECS and work in cooperation with various modules to direct information to and from the display interface. Communications within a vehicle or between the ECS or ESU and the device may involve a DC bus or other means such as separate wiring. Any suitable protocol may be used, including UART, LIN (or DC-LIN), CAN, SPI, I2C (including Intel's SMBus), and DMX (e.g., DMX512). In general, communications from the ECS or ESU with a device may be over a DC bus or, if needed, over an AC/DC bus, or by separately wired pathways if desired, or wireless.

Communication to the cloud may occur via the communication module and involve wired or wireless connections. If wireless, various communication techniques may be employed such as Visible Light Communication (VLC), Worldwide Interoperability for Microwave Access (WiMAX), Long Term Evolution (LTE), Wireless Local Area Network (WLAN), Infrared (IR) communication, Public Switched Telephone Network (PSTN), Radio waves, and other communication techniques.

Electrostatic Module

Assessment of charge in an energy storage unit can be conducted based on measurements made with the charging/discharging hardware in communication with specific modules of the ECS. In general, an electrostatic module can manage the measurement of charge and processing of the data.

The electrostatic module may be configured to identify the power pack type and the capacity of each power pack connected to the modular multi-type power pack energy storage unit. Further, the electrostatic module may be configured to retrieve information related to the type of power packs from the charging database. The electrostatic module may determine the capacity of each power pack to be charged. It may be configured to determine the capacity of each power pack when connected to the modular multi-type power pack ESU.

The electrostatic module may be configured to determine if each power pack charged below the threshold limit. For example, in one aspect, the electrostatic module may check whether each of the plurality of power packs may have a capacity below the threshold limit. The electrostatic module may also be configured to send data related to power packs to the ECS.

Various Databases

The ECS may access various databases via an interface to the cloud and store retrieved information in the memory to guide the various modules.

Further, the memory may comprise a charging database or information from such a database obtained from the databases or the cloud. In one aspect, the charging database may be configured to store information related to various power packs used while charging and discharging from the ESU. In one aspect, the charging database may be configured to store information related to the power cycle of each of the plurality of power packs, the maximum and minimum charge for different types of power packs, and the state of charge (SoC) profile of each of the plurality of power packs.

The charging database may be configured to store information related to managing the plurality of power packs, such as the type of power pack to be charged, safety specifications, recent performance data, bidirectional charging requirements, or history of each of the plurality of power packs, etc. In another aspect, the stored information may also include, but is not limited to, the capacity of each of the plurality of power packs, amount of charge required for one trip of the electric vehicle along the path, such as golf course, etc., charging required for a supercapacitor unit, etc. In another aspect, the charging database may provide a detailed research report for the electric vehicle's average electric charge consumption over a path. In one aspect, the charging database may be configured to store information of the consumption of the electric charge per unit per kilometer drive of the electric vehicle from the plurality of power packs. For example, such information may indicate that a golf cart is equipped with five supercapacitor-driven power packs each at 90% charge, with each power packable to supply a specified amount of ampere-hours (Ah) of electric charge resulting in an ability to drive under normal conditions at top speed for, say, 80 kilometers. The information may also indicate that a solar cell installed on the roof of the golf cart would, under current partly clouded conditions, still provide enough additional charge over the planned period of use to extend the capacity of the ESU by another 40 kilometers for one passenger.

The performance module may use the charging database to read data and store new data on the individual energy storage units such as the power packs.

Power Pack

A power pack is a unit that can store and deliver charge within an energy storage unit and comprises one or more supercapacitors such as supercapacitors in series and parallel. It may further comprise or cooperate with temperature sensors, charge and current sensors (circuits or other devices), connectors, switches such as crosspoint switches, safety devices, and control systems such as charge and discharge control systems. In various aspects described herein, the power pack may comprise a plurality of supercapacitors and have an energy density greater than 200 kWhr/kg, 230 kWhr/kg, 260 kWhr/kg, or 300 kWhr/kg, such as from 200 to 500 kWhr/kg, or from 250 to 500 kWhr/kg. The power pack may have a functional temperature range from $-70°$ C. to $+°$ C., such as from $-50°$ C. to $°$ C. or from $-40°$ C. to $80°$ C. The voltage provided by the power pack may be any practical value such as 3V or more significant, such as from 3V to 240 V, 4V to 120 V, etc.

By way of example, a power pack may comprise one or more units, each comprising at least one supercapacitor having a nominal voltage from 2 to 12 V, such as from 3 to 6 V, including supercapacitors rated at about 3, 3.5, 4, 4.2, 4.5, and 5 V. For example, in discharge testing, a power pack was provided and tested with 14 capacitors in series and five series in parallel charged with 21,000 F at 4.2 V and had 68-75 Wh. Power packs may be packaged in protective casings that can easily be removed from an ESU and replaced. They may also comprise connectors for charging and discharging. Power packs may be provided with generally rectilinear casings, or they may have cylindrical or other useful shapes.

Supercapacitor Information

Supercapacitors

A supercapacitor may have two electrode layers separated by an electrode separator wherein each electrode layer is electrically connected to a current collector supported upon an inert substrate layer; further comprising an electrolyte-impervious layer disposed between each electrode layer and each conducting layer to protect the conducting layer, and a liquid electrolyte disposed within the area occupied by the active electrode layers and the electrode separator. To inhibit electrolyte flow, the liquid electrolyte may be an ionic liquid electrolyte gelled by a silica gellant or other gellant.

The supercapacitor may comprise an electrode plate, an isolation film, a pole, and a shell. The electrode plate comprises a current collector, and a coating is disposed of on the current collector. The coating may comprise an active material that may include carbon nanomaterial such as graphene or carbon nanotubes, including nitrogen-doped graphene, a carbon nitride, carbon materials doped with a sulfur compound such as thiophene or poly 3-hexylthiophene, etc., or graphene on which is deposited nanoparticles of metal oxide such as manganese dioxide. The coating may further comprise a conductive polymer such as one or more polyaniline, polythiophene, and polypyrrole. Such polymers may be doped with various substances such as boron (especially in the case of polyaniline).

Electrodes in supercapacitors may have thin coatings in electrical communication with a current collector, to provide high electrode surface area for high performance, electrodes may comprise porous material with a high specific surface area such as graphene, graphene oxide, or various derivatives of graphene, carbon nanotubes or other carbon nanomaterials including activated carbon, nitrogen-doped graphene or another doped graphene, graphite, carbon fiber-cloth, carbide-derived carbon, carbon aerogel. They may comprise various metal oxides such as oxides of manganese, etc. All such materials may be provided in multiple layers and generally planar, cylindrical, or other geometries. Electrolytes in the supercapacitor may include semi-solid or gel electrolytes, conductive polymers or gels thereof, ionic liquids, aqueous electrolytes, and the like. Solid-state supercapacitors may be used.

Supercapacitors may be provided with various indicators and sensors about charge state, temperature, and other performance and safety aspects. An actuation mechanism may be integrated to prevent undesired discharge.

The voltage of an individual supercapacitor may be greater than 2 V, such as from 2.5 V to 5 V, 2.7 V to 8 V, 2.5 V to 4.5 V, etc.

Supercapacitors can be divided into units of smaller supercapacitors. In one embodiment, a "constant voltage unit" of five units can be joined together in parallel to maintain the voltage but supply five times more current. In another embodiment, a "constant current unity" can include five units joined together in series to multiply the unit voltage by five times but maintain the current. In another embodiment, supercapacitors can provide hybrid "constant voltage units" and "constant current units." In yet another embodiment, supercapacitors units can be connected in any number of combinations to end up with a supercapacitor of optimum design. In another embodiment, each supercapacitor unit can comprise various subunits or pouches. Supercapacitor subunits can be combined using constant current, voltage, or any combination. Supercapacitor units or subunits can comprise size or form factors in yet another embodiment. In yet another embodiment, each subunit and unit can be uniquely addressed to turn on or off the supercapacitor unit or sub-unit on or off. This is achieved with any variety of crossbar switches. A crossbar switch is an assembly of individual switches between inputs and a set of outputs. The switches are arranged in a matrix. If the crossbar switch has M inputs and N outputs, then a crossbar has a matrix with M×N cross-points or places where the connections cross. At each crosspoint is a switch; when closed, it connects one of the inputs to one of the outputs. A given crossbar is a single layer, non-blocking switch. A non-blocking switch means that other concurrent connections do not prevent connecting other inputs to other outputs. Collections of crossbars can be used to implement multiple layers and blocking switches. A crossbar switching system is also called a coordinate switching system. In this way, a crossbar switch can select any combinations of pouches or subunits and units to obtain any combination. The crossbar switches can be used to test units or subunits and optimize supercapacitor performance.

Powered Devices and Electric Vehicles, Etc.

Powered devices powered by the ESU can include electric vehicles and other transportation devices of all kinds, such as those for land, water, or air, whether adapted to operate without passengers or with one or more passengers. Electric vehicles may include automobiles, trucks, vans, forklifts, carts such as golf carts or baby carts, motorcycles, electric bikes scooters, autonomous vehicles, mobile robotic devices, hoverboards, monowheels, Segways® and other personal transportation devices, wheelchairs, drones, personal aircraft for one or more passengers and other aeronautical devices, robotic devices, aquatic devices such as boats or personal watercraft such as boats, Jet Skis®, diver propulsion vehicles or underwater scooters, and the like, etc. The electric vehicle generally comprises one or more motors connected to the ESU and an energy control system (ECS) that controls the power delivered from the ESU and may comprise a user interface that provides information and control regarding the delivery of power from the ESU as well as information regarding performance, remaining charge, safety, maintenance, security, etc. Not all transportation devices require non-stationary motors. An elevator, for example, may have a substantially stationary motor while the cabin moves between the level of a structure. Other transport systems with mobile cabins, seats, or walkways may be driven by stationary motors driving cables, chains, gears, bands, etc.

Apart from electric vehicles, there are many other devices that the ESU may power in cooperation with the ESC. Such other devices can include generators, which in turn can power an endless list of electric devices in households and industry. ESUs of various sizes and shapes can also be integrated with a variety of motors, portable devices, wearable or implantable sensors, medical devices, acoustic devices such as speakers or noise cancellation devices, satellites, robotics, heating and cooling devices, lighting systems, rechargeable food processing tools and systems of all kinds, personal protection tools such as tasers, lighting and heating systems, power tools, computers, phones, tablets, electric games, etc. In some versions, the powered device is the grid, and in such versions, the ESU may comprise an inverter to turn DC into AC suitable for the grid.

In some aspects, a plurality of devices such as electric vehicles may be networked together via a cloud-based network, wherein the devices share information among themselves and with a central message center such that an administrator can assist in managing the allocation of resources, oversee maintenance, evaluate the performance of vehicles and ESUs, upgrade software or firmware associated with the ESC to enhance performance for the particular needs of individual users or a collective group, adjust operational settings to better cope with anticipated changes in weather, traffic conditions, etc., or otherwise optimize performance.

Implementation in Hybrid Vehicles

When installed in electric vehicles, the ESU may comprise both power packs and one or more lead-acid batteries or other batteries. The ESU may power both the motor and the onboard power supply system. The display interface of the associated ESC may comprise a graphical user interface such as the vehicle's control panel (e.g., a touch panel). The display interface may also comprise audio information and verbal input from a user.

Motors

The ESU may power any electric motor. The major classes of electric motors are: 1) DC motors, such as series, shunt, compound wound, separately excited (wherein the connection of stator and rotor is made using a different power supply for each), brushless, and PMDC (permanent magnet DC) motors, 2) AC motors such as synchronous, asynchronous, and induction motors (sometimes also called asynchronous motors), and 3) special purpose motors such as servo, stepper, linear induction, hysteresis, universal (a series-wound electric motor that can operate on AC and DC power), and reluctance motors.

Display Interface

The display interface of the ESC may be displayed on or in the device, such as on a touch screen or other display in a vehicle or on the device, or it may be displayed by a separate device such as the user's phone. The display interface may comprise or be part of a graphic user interface such as the vehicle's control panel (e.g., a touch panel). The display interface may also comprise audio information and verbal input from a user. It may also be displayed on the ESU itself or a surface connected to or communicated with the ESU. In one version, the display interface may include but is not limited to a video monitoring display, a smartphone, a tablet, and the like, each capable of displaying a variety of parameters and interactive controls. Still, the display could also be as simple as one or more lights indicating charging or discharging status and optionally one or more digital or analog indicators showing remaining useful lifetime, % power remaining, voltage, etc.

Further, the display interface may be any state-of-the-art display means without departing from the scope of the disclosure. In some aspects, the display interface provides graphical information on charge status, including one or more fractions of charge remaining or consumed, remaining useful life of the ESU or its components (e.g., how many miles of driving or hours of use are possible based on current or projected conditions or based on an estimate of the average conditions for the current trip or period of use), and may also provide one or more user controls to allow selection of settings. Such settings may include low, medium, or high values for efficiency, power, etc.; adjustment of operating voltage when feasible; safety settings (e.g., prepare the ESU for shipping, discharge the ESU, increase active cooling, only apply low power, etc.); planned conditions for use (e.g., outdoors, high-humidity, in the rain, underwater, indoors, etc.). Selections may be made through menus and buttons on a visual display, through audio "display" of information responsive to verbal commands, or through text commands or displays transmitted to a phone or computer, including text messages or visual display via an app or web page.

Thus, the ESU may comprise a display interface coupled to the processor to continuously display the status of charging and discharging the plurality of power packs.

Solar Power and Alternate Energy Systems

Solar panels produce electrical power through the photovoltaic effect, converting sunlight into DC electricity. This DC electricity may be fed to a battery via a solar regulator to ensure proper charging and prevent damage to the battery. While DC devices can be powered directly from the battery or the regulator, AC devices require an inverter to convert the DC electricity to suitable AC at, for example, 110V, 120V, 220V, 240V, etc.

Solar panels may be wired in series or in parallel to increase voltage or current, respectively. The rated terminal voltage of a 12 Volt solar panel may be around 17 Volts, but the regulator may reduce the voltage to a lower level required for battery charging.

Solar Regulators

Solar regulators (also called charge controllers) regulate current from the solar panels to prevent battery overcharging, reducing or stopping current as needed. They may also include a Low Voltage Disconnect feature to switch off the supply to the load when the battery voltage falls below the cut-off voltage and prevent the battery from sending charge back to the solar panel in the dark.

Regulators may operate with a pulse width modulation (PWM) controller, in which the current is drawn out of the panel at just above the battery voltage, or with a maximum power point tracking (MPPT) controller, in which the current is drawn out of the panel at the panel "maximum power voltage," dropping the current-voltage like a conventional step-down DC-DC converter but adding the "smart" aspect of monitoring of the variable maximum power point of the panel to adjust the input voltage of the DC-DC converter to deliver optimum power.

Inverters

Inverters are devices that convert DC power to AC electricity. They come in several forms, including on-grid solar inverters that convert the DC power from solar panels into AC power which can be used directly by appliances or be fed into the grid. Off-grid systems and hybrid systems can also provide power to batteries for energy storage but are more complex and costly than on-grid systems, requiring additional equipment. An inverter/charger that manages both grid connection and the charging or discharging of batteries may be an interactive or multi-mode inverter. A variation of such inverters is known as the all-in-one hybrid inverter.

Output from inverters may be in the form of a pure sine wave or a modified sine wave, or a square wave. The less expensive modified sine wave output may damage some electronic equipment. Multiple solar panels are connected to a single inverter in a "string inverter" setup in many conventional systems. This can limit system efficiency, for when one solar panel is shaded and has reduced power, the overall current provided to the inverter is likewise reduced. String solar inverters are provided in single-phase and three-phase versions.

Microinverters are miniature forms of inverters that can be installed on the back of individual solar panels, providing the option for AC power to be created directly by the panel. In some examples solar panels can include microinverters. Unfortunately, microinverters limit battery charging efficiency, for the AC power from the panels must be converted back to DC power for battery charging. They also add high costs to the panels. The additional equipment on the panel may also increase maintenance problems and possibly the risk of lightning strikes. Microinverters generally use maximum power point tracking (MPPT) to optimize power harvesting from the panel or module connected to it.

The on-grid string solar inverters and microinverters, collectively called solar inverters, provide AC power fed to the grid or directly to a home or office. Alternatively, off-grid inverters (or "battery inverters") or hybrid inverters can charge batteries. Hybrid inverters can charge batteries with DC and provide AC for the grid or local devices, combining a solar inverter and battery inverter/charger into a single unit.

Solar power systems may employ "deep cycle solar batteries" designed for discharge over a long time (e.g., several days). Such batteries may be at risk of permanent damage if highly discharged, such as below 30% capacity. They also may suffer the drawback of delivering less total charge at a high load than at a low load due to overheating problems at elevated discharge rates.

General Language:

All patents and applications cited must be understood as being incorporated by reference to their compatible degree.

For all ranges given herein, it should be understood that any lower limit may be combined with any upper limit when feasible. Thus, for example, citing a temperature range of from 5° C. to ° C. and from 20° C. to 200° C. would also inherently include a range of from 5° C. to 200° C. and a range of 20° C. to 200° C.

When listing various aspects of the products, methods, or system described herein, it should be understood that any feature, element, or limitation of one aspect, example, or claim may be combined with any other feature, element, or limitation of any other aspect when feasible (i.e., not contradictory). Thus, disclosing an example of a power pack comprising a temperature sensor and then a different example of a power pack associated with an accelerometer would inherently disclose a power pack comprising or associated with an accelerometer and a temperature sensor.

Unless otherwise indicated, components such as software modules or other modules may be combined into a single module or component or divided. The function involves the cooperation of two or more components or modules. Identifying an operation or feature as a single discrete entity should be understood to include division or combination such that the effect of the identified component is still achieved.

Some embodiments of this disclosure, illustrating its features, will now be discussed in detail. It can be understood that the embodiments are intended to be open-ended in that an item or items used in the embodiments is not meant to be an exhaustive listing of such items or items or meant to be limited to only the listed item or items.

It can be noted that as used herein and in the appended claims, the singular forms "a," "an," and "the" include plural references unless the context clearly dictates otherwise. Although any systems and methods similar or equivalent to those described herein can be used to practice or test embodiments, only some exemplary systems and methods are now described.

FIG. 1. is a block diagram illustrating an architecture of an energy management system 100 according to aspects of the disclosure. This energy management system 100 comprises at least one electrochemical (EC) battery 102 such as Lead-acid or lithium-ion, etc. The energy management system 100 includes an SC adder module 104, which is a self-contained unit with a plurality of connections 126 and configured to connect a plurality of power sources within the electrochemical (EC) Batteries battery 102. The SC adder module 104 has a higher capacity than EC batteries and deliver charges at a much smaller weight and size. The SC adder module 104 comprises SC batteries 112 and contains a control system to selectively provide power from at least one of the EC battery 102 or SC batteries 112. According to aspects of the disclosure, the SC adder module 104 may switch between the EC battery 102 and the SC batteries 112 could allow the SC batteries to power electric vehicle when different currents (e.g., different amperages) are demanded quickly (e.g., moving up a steep hill). Another reason to switch from an EC battery 102 and SC battery 112 may be to prolong the life of the EC battery 102. According to aspects of the disclosure, the SC adder module 104 can The fit into the existing battery compartments of an electric vehicle 120. SC adder module 104 is designed to easily connect to the EC Battery 102 and the electric vehicle 120 using standard battery connections, which are shown as connections 126, and wiring involved in either path 1 or path 2. It should be noted that the wiring layout of path 1 and path 2 is one example of how switching may occur, but there could be other configurations depending upon how the SC adder module 104 is designed.

In another aspect, the reason to switch from an EC battery 102 and the SC battery 112 or vice versa is to reduce the charging cycles of the EC battery 102. In another aspect, another reason to switch a power source from an EC battery 102 and the SC battery 112 or vice versa is to use the greater electrical charge stored by supercapacitors. In other aspects, switching from an EC battery 102 and SC battery 112 or vice versa would optimize discharge, as the discharge is faster for Supercapacitor battery 112. In another aspect, the reason to switch from an EC battery 102 and SC battery 112 or vice versa would be to enhance the long-term power storage of electrochemical batteries. In another aspect, the reason to switch from an EC battery 102 and SC battery 112 or vice versa would be to enhance the lifespan of electrochemical batteries as supercapacitors can have a million charge cycles before degradation, whereas an EC battery (e.g., lead-acid batteries) may have 500 to 1,000 charge cycles before degradation. Further, a switch and test module 106 allows a current measurement in path 1 to determine a current (e.g., an amperage) drawn from the EC battery 102 into the electric vehicle 120. The switch and test module 106 can also be instructed to selectively connect (e.g., disconnect or connect) the EC battery 102 using a digitally controlled relay capable of handling high power. The switch and test module 106 has a switching time measured in milliseconds to ensure smooth operation of the electric vehicle 120.

In one aspect, the base module 108 determines if current is being drawn from the SC batteries 112 at step 200. The base module 108 is configured to determine if the SC batteries 112 are being used on path 2 124 from SC controller 116 and execute a battery management system (BMS) module 128 at step 202. Base Module 108 switches to path 1 122 using switch and test module 106 if the SC batteries 112 are not being used at step 204. The base module 108 returns to step 200, at step 206. The base module 108 ends operation at step 216. In some aspects, the controller 110 is a processor configured to execute commands in memory 114 from the base module 108, performs reading and writing the database 118, and allows instruction to turn on and off the switch and test module 106 and the SC Controller 116. The controller 110 also allows for current measurements from path 1 or path 2 to be collected and stored in real-time in the database 118. In some aspects, the controller 110 also controls the switching of the high-powered switching relay in path 1 and path 2 based on instructions from the base module 108. The SC batteries 112 are any type or group of Supercapacitor batteries designed to have enough capacity to be integrated with the SC adder module 104 and the EC Battery 102. For example, the SC batteries 112 may output the same voltage as EC Battery 102 to integrate into the electric vehicle 120 easily. The memory 114 is configured to store the base module 108 and various other sub-modules (e.g., the BMS module 128) and the database 118.

Further, the SC Controller 116 may be configured to poll the Base Module 108, at step 300. The SC Controller 116 determines if the base module 108 is providing instructions to operate the SC controller 116 to switch between EC battery 102 and the SC batteries 112, and then the SC controller 116 disconnects path 1 by instructing the switch and a test module 106 to disconnect path 1. For example, the SC controller 116 may be configured to actuate one or more high power relays (not shown) and to couple the SC Batteries 112 to path 2 and provide power to the electric vehicle 120 has power. The SC controller 116 determines if the base module 108 provides instructions to the SC controller 116 to switch between the SC batteries 112 and the EC batteries 102. For example, the SC Controller 116 disconnects path 2 using high-powered switching relays (not shown) and then instructs the switch and test module 106 to connect path 1 with a high-powered switching relay (not shown). Connecting path 1 to the electric vehicle 120 couples the EC Battery 102 and provides power to the electric vehicle 120 at step 304. The SC controller 116 then returns control to the base module 108 at step 306.

In some aspects, the database 118 allows receives data from the base module 108, sub-modules of the base module 108, and the switch and test module 116, and the SC Controller 116, and stores the received data. The database 118 also stores the recommended max charging energy or amperage provided from the SC batteries 112. It should be understood that the SC adder module 104 may include many different SC batteries 112, and the charging data can be used for safety and performance. The database 118 also stores data and prestored thresholds related to the BMS. The electric vehicle 120 may be any electric vehicle such as an industrial vehicle, a transportation vehicle, an entertainment vehicle, etc.

In some aspects, the path 1 122 shows that connections between Electric Vehicle 120 and EC Battery 102 may be interrupted by the SC adder module 104. In some other aspects, the path 2 124 shows connections between the electric vehicle 120 and the SC controller 116 and allows current from the SC batteries 112 to flow into the electric vehicle 120. The connections 126 may be electrical contact points (e.g., battery terminals) that connect the SC adder module 104 to the energy management system 100. The BMS module 128 may be executed by the base module 108 at step 400. The BMS module 128 may be configured to decouple the switch and test module 106 from the path 1 122, at step 402. When the BMS module 128 decouples the switch and test module 106 from the path 1 122, the BMS module 128 may couple the SC batteries 112 to electric vehicle 120, at step 404. The BMS module 128 holds out 20% of SC batteries 112 units and subunits from powering path 2 124 using a crossbar addressable switch matrix on SC batteries 112 (not shown). It should be noted that the percentage of hold out would be initially a fixed number percentage based upon design specifications of the SC Adder Module 104. Still, this number could change by any of several means, such as (1) selectable by the user (not shown), (2) using AI and machine learning to adjust the hold-out percentage as needed, and (3) by some algorithm based upon the speed of swapping needed, at step 406. BMS Module 128 measures all SC Batteries 112 units and subunits for voltage and charge, using crossbar addressable switch matrix on SC batteries 112 (not shown), at step 408. BMS Module 128 determines if all SC batteries 112 units and subunits are balanced (e.g., 5% of voltage and charge). In one aspect, this is done by calculating the average of all the SC battery 112 units and subunits at step 410. BMS Module 128 determines, for an SC battery 112 less than 5% of average, swap in the number of SC battery 112 units and subunits from Hold out storage and swap out those SC batteries 112 units and subunits to Hold out storage. This is done on a rotating basis; First, in SC batteries, 112 units and subunits into hold-out storage become the last out on the next rotation. In this way, holding storage will likely have enough voltage and charge to swap with those SC batteries 112 units and subunits that do not. The swapping in and out of SC battery 112 units and subunits is accomplished by turning on and off SC battery 112 units and subunits using the crossbar addressable matrix switch (not shown) at step 412. BMS Module 128 returns to step 408 until interrupted by base module 108. It should be noted that a wait time can be added, so the swapping measurements might be every 5 minutes or longer or based upon the speed of degradation of the SC batteries 112. It should also be noted that the BMS Module will be rest once the SC batteries 112 are recharged, at step 414, element 128.

In some aspects, the previous state of the electrochemical battery will determine how the Battery Management system manages the supercapacitors. For instance, in the electrochemical batteries are fully charged, it is likely the supercapacitors will be less likely needed to be swapped in quickly, so the Battery Management system operates to relax the threshold between switching pouches. On the other hand, if the electrochemical battery is near the end of the load curve, switching to the supercapacitor battery management system will be managed with tight thresholds and be used to manage the supercapacitor load curve as long as possible to take as much of the load away from the electrochemical battery.

Functioning of the "Base Module" will now be explained with reference to FIG. 2. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosure.

Figure 2:
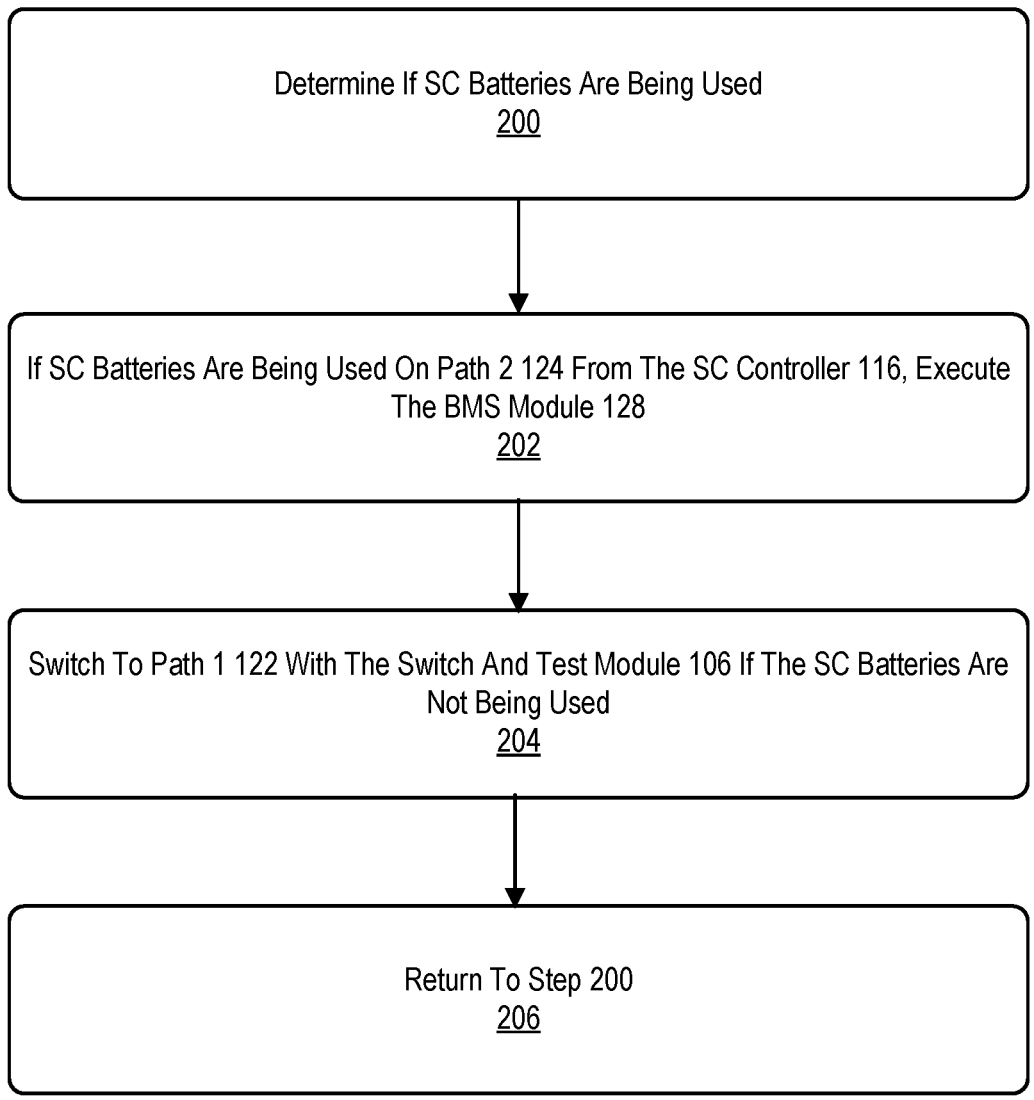
FIG. 2 is a flow diagram illustrating a process performed using a Base Module according to some examples.

FIG. 2. displays the base module 108. The process begins with determining if SC batteries 112 are being used at step 200. The base module 108 determines that the SC batteries 112 are being used on path 2 124 from SC controller 116 and executes the BMS module 128 at step 202. The base module 108 switches to path 1 122 using the test module 106 if SC batteries 112 are not used at step 204. The base module 108 returns to step 200, at step 206. The base module 108 ends operation at step 216.

Functioning of the SC controller will now be explained with reference to FIG. 3. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosure.

Figure 3:
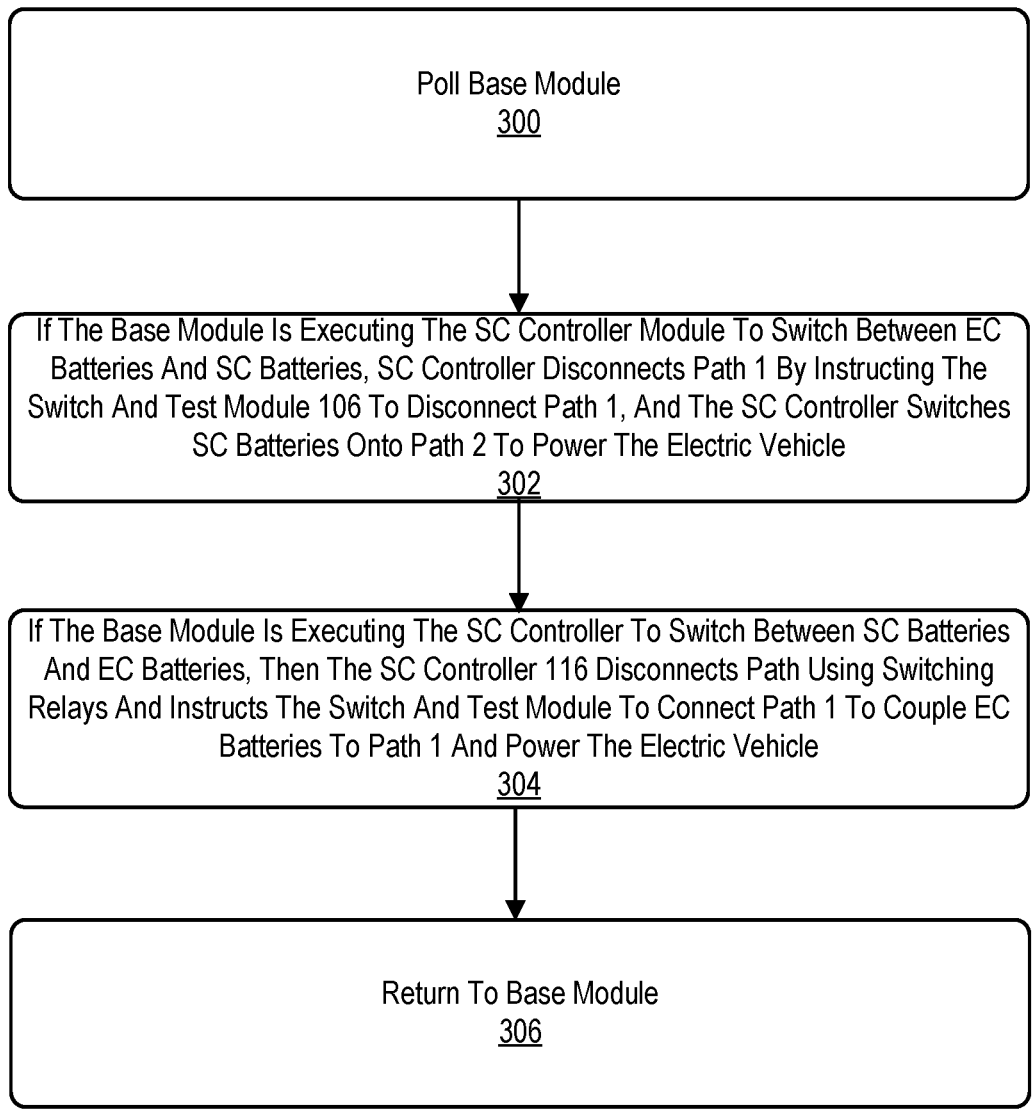
FIG. 3 is a flow diagram illustrating a process performed using an SC Controller according to some examples.

FIG. 3. shows an example method of the SC controller 116. The process begins with the SC controller 116 polling the base module 108, at step 300. For example, the SC Controller 116 determines if Base Module 108 executes the SC controller 116 to switch between the EC batteries 102 and the SC batteries 112, then the SC controller 116 instructs the switch and test module 106 to disconnect path 1 (not shown this is done with a high powered switching relay) and the SC Controller 116 to couple the SC batteries 112 to path 2, using high powered switching relays (not shown) to power the electric vehicle 120 at step 302. The SC controller 116 determines if the base module 108 executes the SC controller 116 to switch between the SC batteries 112 and EC batteries 102. The SC controller 116 is configured to disconnect path 2 124 using high-powered switching relays (not shown) and then instruct the switch and test module 106 to connect path 1 122 (not shown; this is done with a high-powered switching relay). This couples the EC battery 102 to path 1 so that Electric Vehicle 120 has power at step 304. The SC controller 116 then returns control to the base module 108 at step 306.

The functioning of the BMS module 128 will now be explained with reference to FIG. 4. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosure.

Figure 4:
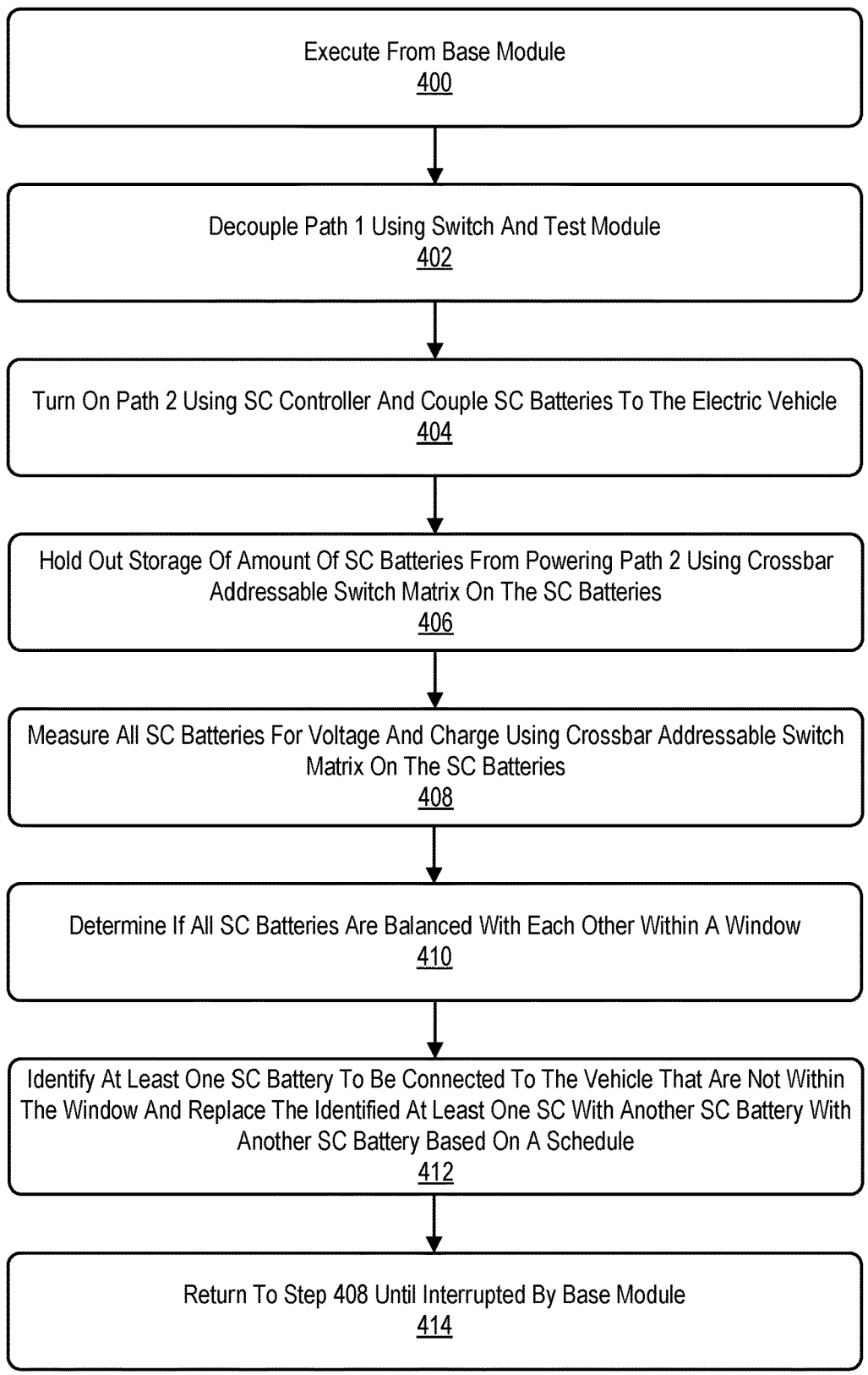
FIG. 4 is a flow diagram illustrating a process performed using a BMS Module, according to some examples.

FIG. 4. displays an example flowchart of a process implemented by the BMS module 128. The process begins with the BMS module 128 being executing by the base module 108 at step 400. The BMS Module 128 is configured to shut off path 1 122 using switch and test module 106, at step 402. The BMS module 128 is configured to turn on path 2 124 using the SC controller 116 connecting the SC batteries 112 to Electric Vehicle 120, at step 404. The BMS module 128 holds out a fixed mount (e.g., reserves 20%) of the SC batteries 112 units and subunits from powering path 2 126 using crossbar addressable switch matrix on SC batteries 112 (not shown). It should be noted that the percentage of hold out would be initially a fixed number percentage based upon design specifications of the SC Adder Module 104. The hold out percentage could change by any of several means, such as (1) selectable by the user (not shown), (2) using AI and machine learning to adjust the hold-out percentage as needed, and (3) by some algorithm based upon the speed of swapping needed, at step 406. The BMS module 128 measures all SC Batteries 112 units and subunits for voltage and charge using crossbar addressable switch matrix on SC batteries 112 (not shown), at step 408. BMS Module 128 determines if all SC batteries 112 units and subunits are balanced (e.g., 5% of voltage and charge). In one aspect, this is done by calculating the average of all the SC battery 112 units and subunits at step 410. BMS Module 128 determines, for an SC battery 112 less than 5% of average, swap in the number of SC battery 112 units and subunits from Hold out storage and swap out those SC batteries 112 units and subunits to Hold out storage. This is done on a rotating basis; First, in SC batteries, 112 units and subunits into hold-out storage become the last out on the next rotation. In this way, holding storage will likely have enough voltage and charge to swap with those SC batteries 112 units and subunits that do not. The swapping in and out of SC battery 112 units and subunits is accomplished by turning on and off SC battery 112 units and subunits using the crossbar addressable matrix switch (not shown) at step 412. BMS Module 128 returns to step 408 until interrupted by base module 108. It should be noted that a wait time can be added, so the swapping measurements might be every 5 minutes or longer or based upon the speed of degradation of the SC batteries 112. It should also be noted that the BMS module will be rest once the SC batteries 112 are recharged, at step 414.

Figure 5:
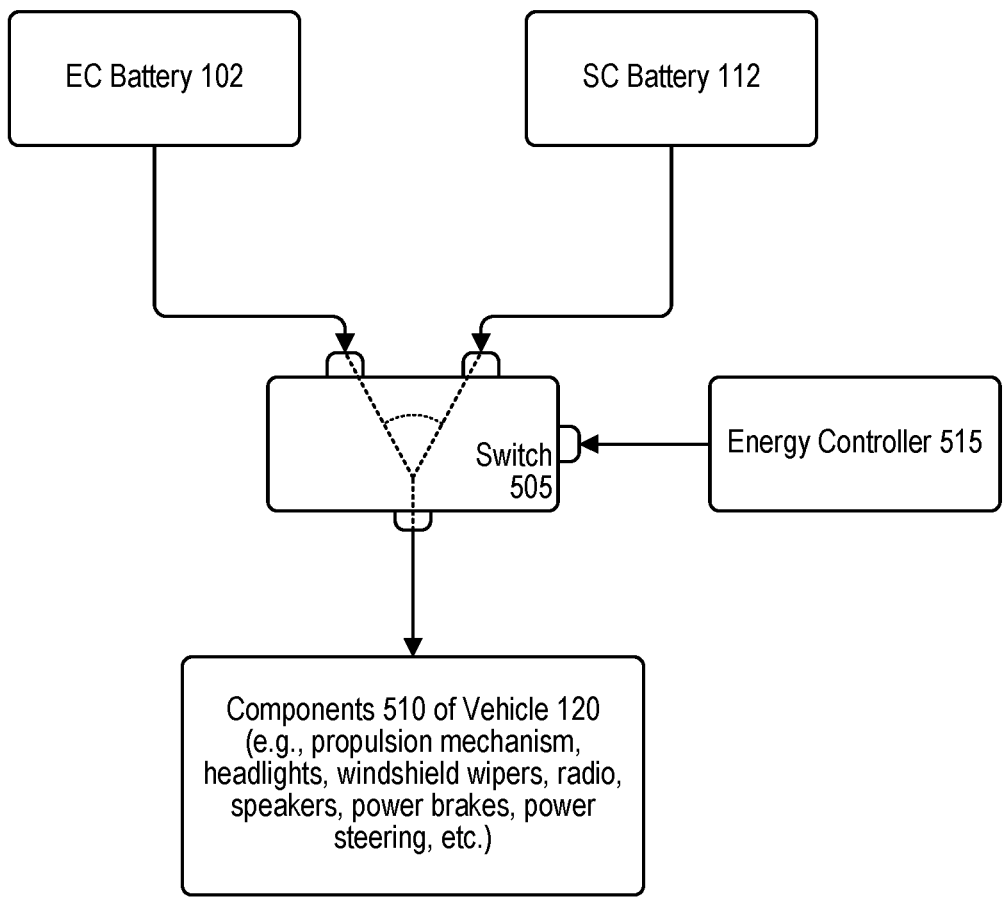
FIG. 5 is a block diagram illustrating a switch controlled by an energy controller that toggles between a first configuration in which components draw power from an electrochemical battery and a second configuration in which the components draw power from a supercapacitor battery, according to some examples.

FIG. 5 is a block diagram illustrating a switch 505 controlled by an energy controller 515 that toggles between a first configuration in which components 510 draw power from an electrochemical battery 102 and a second configuration in which the components 510 draw power from a supercapacitor battery 112. The components 510 are components of an electric vehicle 120, such as a propulsion mechanism (e.g. engine and/or motor and/or other actuator), headlights, windshield wipers, radio, speakers, power brakes, power steering, display, camera, sensors, and the like. The first configuration is illustrated by a dashed line to the left, connecting the EC battery 102 to the components 510, and disconnecting the SC battery 112 from the components 510. The second configuration is illustrated by a dashed line to the right, connecting the SC battery 112 to the components 510, and disconnecting the EC battery 102 from the components 510. The toggling of the switch 505 between the two configurations can be controlled by the energy controller 515, which can be an example of the energy management system 100, the electrochemical battery 102, the SC adder module 104, the switch and test module 106, the SC controller 108, the controller 110, the SC batteries 112, the memory 114, the base module 116, the database 118, electric vehicle 120, or a combination thereof. The switch 505 can be a mechanical switch, a Single Pole Single Throw (SPST) switch, a Single Pole Double Throw (SPDT) switch, a Double Pole Single Throw (DPST) switch, a Double Pole Double Throw (DPDT) switch, a toggle switch, a transistor switch, an NPN transistor switch, a PNP transistor switch, an H-bridge switch, or a combination thereof.

Figure 6:
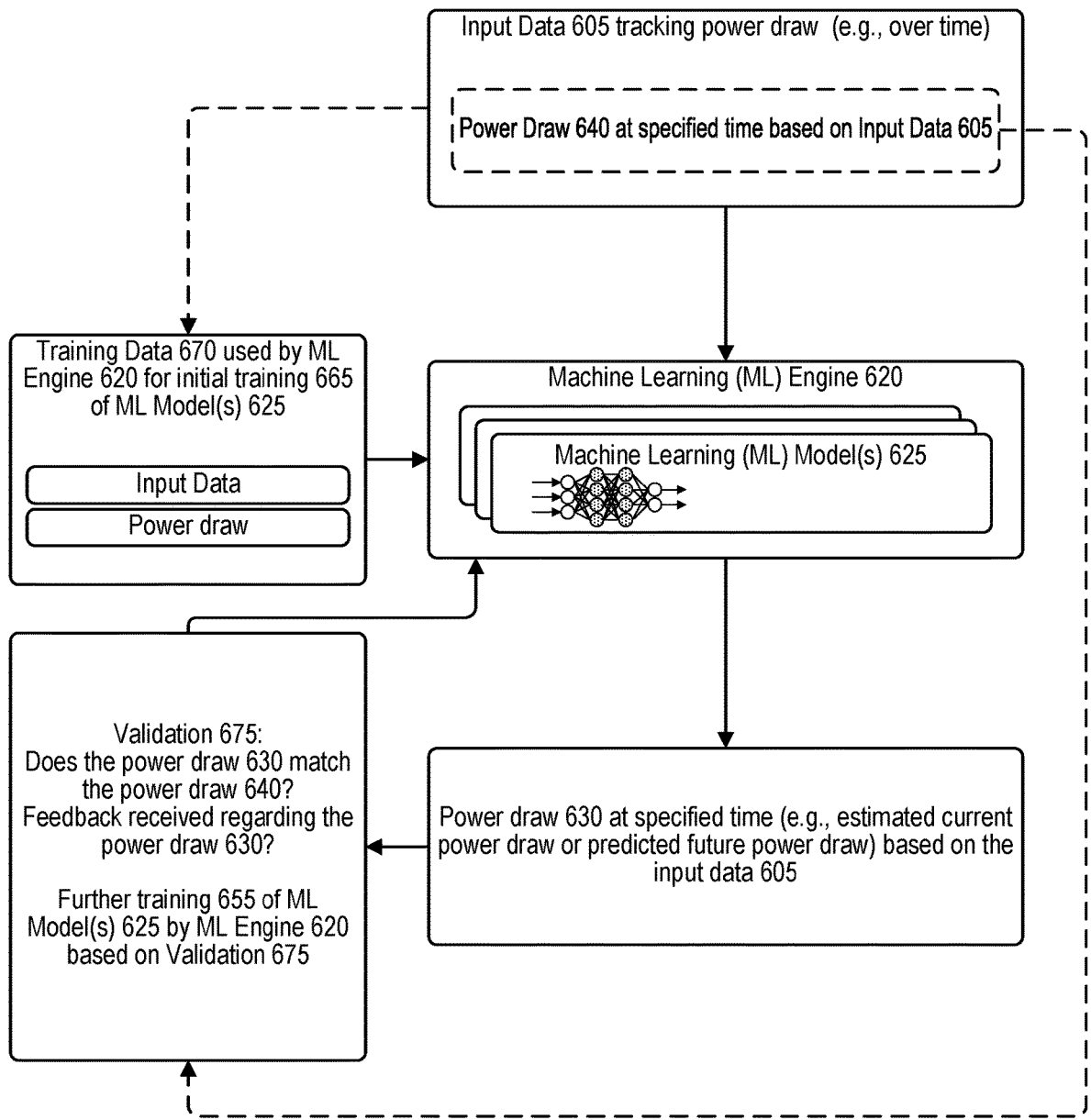
FIG. 6 is a block diagram illustrating a switch controlled by an energy controller that toggles between a first configuration in which components draw power from an electrochemical battery and a second configuration in which the components draw power from a supercapacitor battery, according to some examples.

FIG. 6 is a block diagram 600 illustrating use of one or more trained machine learning models 625 of a machine learning engine 620 to identify a power draw 630, for instance to estimate a current power draw or predict a future power draw. The ML engine 620 and/or the ML model(s) 625 can include one or more neural network (NNs), one or more convolutional neural networks (CNNs), one or more trained time delay neural networks (TDNNs), one or more deep networks, one or more autoencoders, one or more deep belief nets (DBNs), one or more recurrent neural networks (RNNs), one or more generative adversarial networks (GANs), one or more conditional generative adversarial networks (cGANs), one or more other types of neural networks, one or more trained support vector machines (SVMs), one or more trained random forests (RFs), one or more computer vision systems, one or more deep learning systems, one or more classifiers, one or more transformers, or combinations thereof. Within FIG. 6, a graphic representing the trained ML model(s) 625 illustrates a set of circles connected to another. Each of the circles can represent a node, a neuron, a perceptron, a layer, a portion thereof, or a combination thereof. The circles are arranged in columns. The leftmost column of white circles represent an input layer. The rightmost column of white circles represent an output layer. Two columns of shaded circled between the leftmost column of white circles and the rightmost column of white circles each represent hidden layers. The ML engine 620 and/or the ML model(s) 625 can be part of the AI/ML module 182.

Once trained via initial training 665, the one or more ML models 625 receive, as an input, input data 605 that identifies power draw by various components and/or subsystems of a system (e.g., of a vehicle), for instance tracking power draw by various components and/or subsystems of the system (e.g., of the vehicle) over time. In some examples, the input data 605 identifies attribute(s) of charging and/or discharging of an energy storage unit (ESU) (e.g., type, voltage, discharge curve, capacitance, impedance, current, amperage, capacity, energy density, specific energy density, power density, temperature, temperature dependence, service life, physical attributes, charge cycle, discharge cycle, cycle life, deep discharge ability, discharge rate, charge rate, and the like), attribute(s) of the components and/or subsystems of the system (e.g., of the vehicle) that draw charge from the ESU, attribute(s) of the system (e.g., of the vehicle) that includes the ESU and draws charge from the ESU (e.g., mileage, efficiency, ergonomics, aerodynamics, shape, geometry, weight, horsepower, brake power, turning radius, type, size, energy consumption rate, location, speed, velocity, acceleration, deceleration, turning radius, and the like), or a combination thereof.

At least some of the input data 605 may be received from one or more sensors, such as sensors to measure voltage, current, resistance, capacitance, inductance, frequency, power, temperature, continuity, location, motion, acceleration, deceleration, orientation, changes to any of these attributes, or a combination thereof. In some examples, the one or more sensors can include one or more voltmeters, ammeters, ohmmeters, capacimeters, inductance meters, wattmeters, thermometers, thermistors, multimeters, accelerometers, gyrometers, gyroscopes, global navigation satellite system (GNSS) receivers, inertial measurement units (IMUs), or a combination thereof. In some examples, the input data 605 may be received from a one or more databases, such as the database 118, where at least some of the input data 605 may be stored after measurement by the sensors. In some examples, the input data 605 can also include information that is indicative of total capacity of the ESU, the remaining charge and/or remaining capacity of the ESU, a level of shade or shadows that could prevent solar cells from generating charge from light (e.g., whether or not shade or shadows are blocking solar cells to prevent solar charging), a route of the vehicle, a schedule trip of the vehicle, elevation data indicative of uphill and/or downhill portions of a route of the vehicle, or a combination thereof. In some examples, for instance during validation 675, the ML engine 620 and/or the one or more ML models 625 can also receive, as an additional input, a predetermined power draw 640 (e.g., current power draw or predicted future power draw) that is based on (or otherwise corresponds to) the input data 605. In response to receiving at least the input data 605 as an input(s), the one or more ML model(s) 625 estimate the power draw 630 (e.g., current power draw or predicted future power draw) based on the input data 605. The power draw 630 (e.g., current power draw or predicted future power draw) can indicate an amount of power drawn, a rate at which power is drawn, and the like. The power draw can be indicated in terms of voltage, current, resistance, capacitance, inductance, frequency, power, amperage, capacity, energy density, specific energy density, power density, charge cycle, discharge cycle, cycle life, deep discharge ability, discharge rate, charge rate, or a combination thereof. The power draw can be indicated in units of watts, amps, volts, ohms, joules, farads, henries, any of the previously-listed units measured per distance or area (e.g., per meter or per meter squared), any of the previously-listed units measured per unit of time (e.g., per second or per second squared), or a combination thereof.

Identifying the power draw 630 (e.g., estimated current power draw or predicted future power draw) can correspond to at least operations 208, 302, and/or 615. It should be understood that the pre-determined power draw 640 can likewise include any of the types of power draw information listed above with respect to the power draw 630.

Once the one or more ML models 625 identify the power draw 630, the power draw 630 can be output to an output interface that can indicate the power draw 630 to a user (e.g., by displaying the power draw 630 or playing audio indicative of the power draw 630) and/or to the energy management system 100 (e.g., the vehicle), which can adjust settings and/or configurations for the energy management system 100 (e.g., the vehicle), for instance to switch (e.g., as in operation 620) between a first configuration in which components and/or subsystems (e.g., the propulsion system of the vehicle) draw power from an electrochemical battery (and disconnects a supercapacitor from providing power to those components and/or subsystems) and a second configuration in which the components and/or subsystems (e.g., the propulsion system of the vehicle) draw power from an supercapacitor (and disconnects the electrochemical battery from providing power to those components and/or subsystems).

Before using the one or more ML models 625 to identify the power draw 630 the ML engine 620 performs initial training 665 of the one or more ML models 625 using training data 670. The training data 670 can include examples of input data tracking power draw over time (e.g., as in the input data 605) and/or examples of a pre-determined power draw (e.g., as in the pre-determined power draw 640). In some examples, the pre-determined power draw in the training data 670 are power draw(s) that the one or more ML models 625 previously identified based on the input data in the training data 670. In the initial training 665, the ML engine 620 can form connections and/or weights based on the training data 670, for instance between nodes of a neural network or another form of neural network. For instance, in the initial training 665, the ML engine 620 can be trained to output the pre-determined power draw in the training data 670 in response to receipt of the corresponding input data in the training data 670.

During a validation 675 of the initial training 665 (and/or further training 655), the input data 605 (and/or the exemplary input data in the training data 670) is input into the one or more ML models 625 to identify the power draw 630 as described above. The ML engine 620 performs validation 675 at least in part by determining whether the identified power draw 630 matches the pre-determined power draw 640 (and/or the pre-determined power draw in the training data 670). If the power draw 630 matches the pre-determined power draw 640 during validation 675, then the ML engine 620 performs further training 655 of the one or more ML models 625 by updating the one or more ML models 625 to reinforce weights and/or connections within the one or more ML models 625 that contributed to the identification of the power draw 630, encouraging the one or more ML models 625 to make similar power draw determinations given similar inputs. If the power draw 630 does not match the pre-determined power draw 640 during validation 675, then the ML engine 620 performs further training 655 of the one or more ML models 625 by updating the one or more ML models 625 to weaken, remove, and/or replace weights and/or connections within the one or more ML models that contributed to the identification of the power draw 630, discouraging the one or more ML models 625 from making similar power draw determinations given similar inputs.

Validation 675 and further training 655 of the one or more ML models 625 can continue once the one or more ML models 625 are in use based on feedback 650 received regarding the power draw 630. In some examples, the feedback 650 can be received from a user via a user interface, for instance via an input from the user interface that approves or declines use of the power draw 630 for charging the ESU. In some examples, the feedback 650 can be received from another component or subsystem of the vehicle (e.g., an energy control system), for instance based on whether the component or subsystem successfully uses the power draw 630, whether use the power draw 630 causes any problems for the component or subsystem (e.g., which may be detected using the sensors), whether use the power draw 630 are accurate, or a combination thereof. If the feedback 650 is positive (e.g., expresses, indicates, and/or suggests approval of the power draw 630, success of the power draw 630, and/or accuracy the power draw 630), then the ML engine 620 performs further training 655 of the one or more ML models 625 by updating the one or more ML models 625 to reinforce weights and/or connections within the one or more ML models 625 that contributed to the identification of the power draw 630, encouraging the one or more ML models 625 to make similar power draw determinations given similar inputs. If the feedback 650 is negative (e.g., expresses, indicates, and/or suggests disapproval of the power draw 630, failure of the power draw 630, and/or inaccuracy of the power draw 630) then the ML engine 620 performs further training 655 of the one or more ML models 625 by updating the one or more ML models 625 to weaken, remove, and/or replace weights and/or connections within the one or more ML models that contributed to the identification of the power draw 630, discouraging the one or more ML models 625 to make similar power draw determinations given similar inputs.

Figure 7:
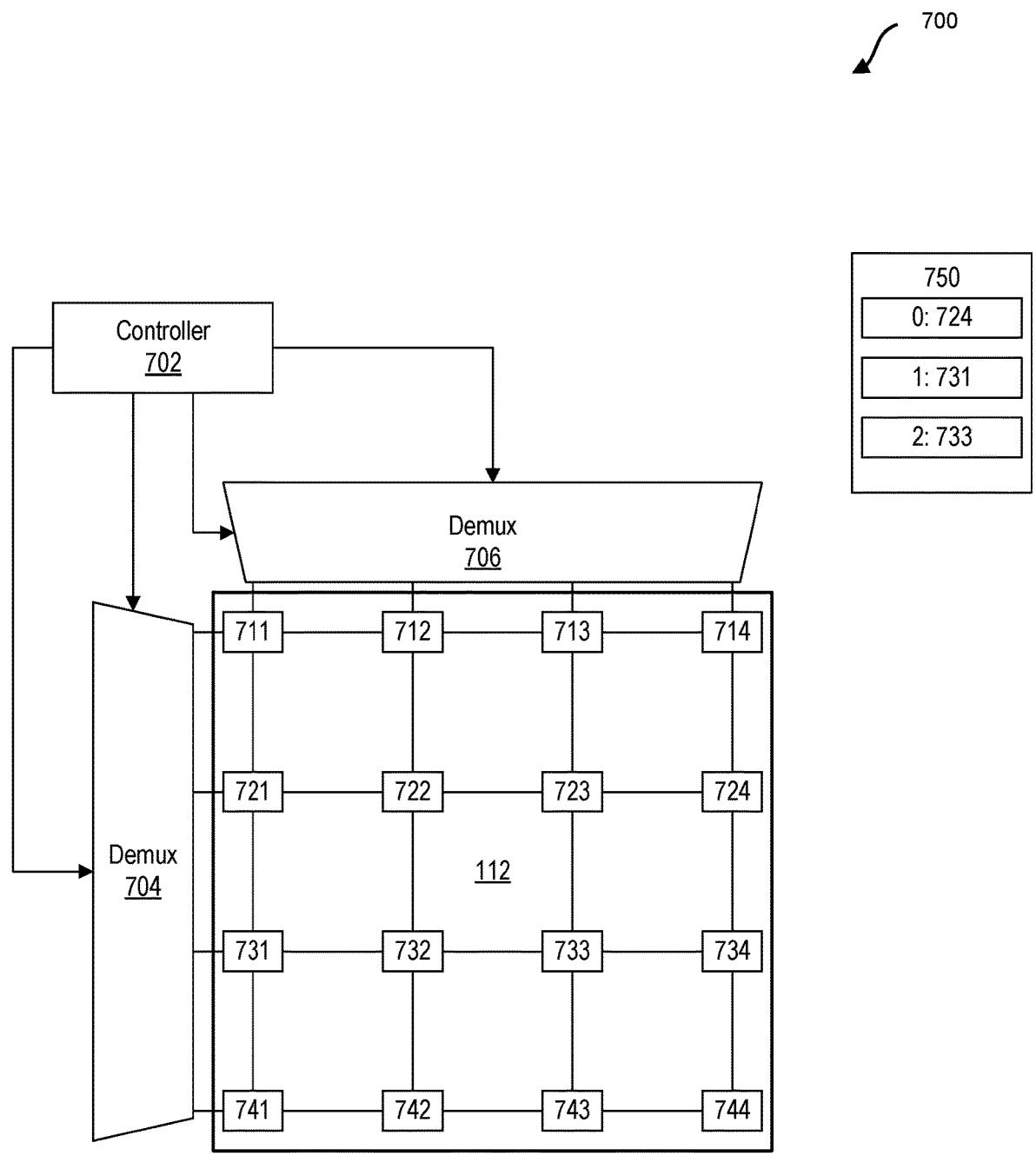
FIG. 7 is a block diagram illustrating use of one or more trained machine learning models of a machine learning engine to identify a power draw, for instance to estimate a current power draw or predict a future power draw, according to some examples.

FIG. 7 illustrates a block diagram of an example crossbar switch 700 that is coupled to the SC battery 112. In some examples, the crossbar switch 700 includes a controller 702, a first demultiplexer 704 (e.g., a demux) and a second demultiplexer 706 to perform logical switching operations to connect, test, and measure the SC batteries 112. As illustrated in FIG. 7, the/12 includes sixteen selectable power sources 711-744 that are addressed by decoding a control signal provided from the controller 702. In some cases, the controller 702 may be integral to or separate from the crossbar switch 700 and is illustrated for exemplary purposes only. The first demultiplexer 704 uses a control signal to select a row, and the second demultiplexer 706 uses a control signal to select a column, thereby allowing the crossbar switch 700 to individually address each power the sixteen selectable power sources 711-744. For example, the crossbar switch 700 can select each of the individual sixteen selectable power sources 711-744 to test for a voltage potential and stored power (e.g., by measuring current). In other aspects, the crossbar switch 700 may be configured to select each of the sixteen selectable power sources 711-744 to combine power to provide to the system (e.g., the electric vehicle 120).

In some cases, a portion of the sixteen selectable power sources 711-744 may be held back, or reserved, for reserve power. The reserve power is to mitigate the power drain to the EC battery 102 to ensure maximize EC battery life 102 and prevent the system (e.g, the electric vehicle 120) from losing total power. In some aspects, the system can reserve a fixed amount of power, such as 20% of the total power, be not connecting the power source to the output. For example, the controller 702, which can be a hardware logic, programmable logic, or a processor, may be configured to maintain a queue 750 that identifies selectable power sources that are held in reserve.

The system can be configured to select a selectable power source 711-744 of the SC batteries 112 to omit from the connection to the system based on deviation from an average. For example, the system can perform an average voltage and current measurement of each selectable power source 711-744 and identify corresponding selectable power source 711-744 to be held in reserve. In some aspects, when the system measures a current or voltage of a selectable power source that deviates from a minimum threshold (e.g., having a value of less than 5% of the average current), the system may place that selectable power source into a set of reserved power sources that are identified in the queue 750. For example, the queue 750 initially identifies power sources 724, 731, and 733 as the reserved power sources. If power source 711 is added to the queue 750, the first value, which is power source 724 is popped and returned to the active pool of selectable power sources. In this case, the queue 750 would identify power sources 731, 733, and 711 in the reserved list of selectable power sources after returning power source 724 to the active pool.

In other case, the power source can be selected based on a different schedule, such as a fixed rotation schedule. For example, the current in each power source can form a ranked list, and the power sources in the queue 750 can be selected based on each time the SC batteries 112 is fully charged. In this case, three selectable power sources are selected to reserve 18.75% of the power. In other cases, the number of selectable power sources can change based on life expectancy of the selectable power sources.

Figure 8:
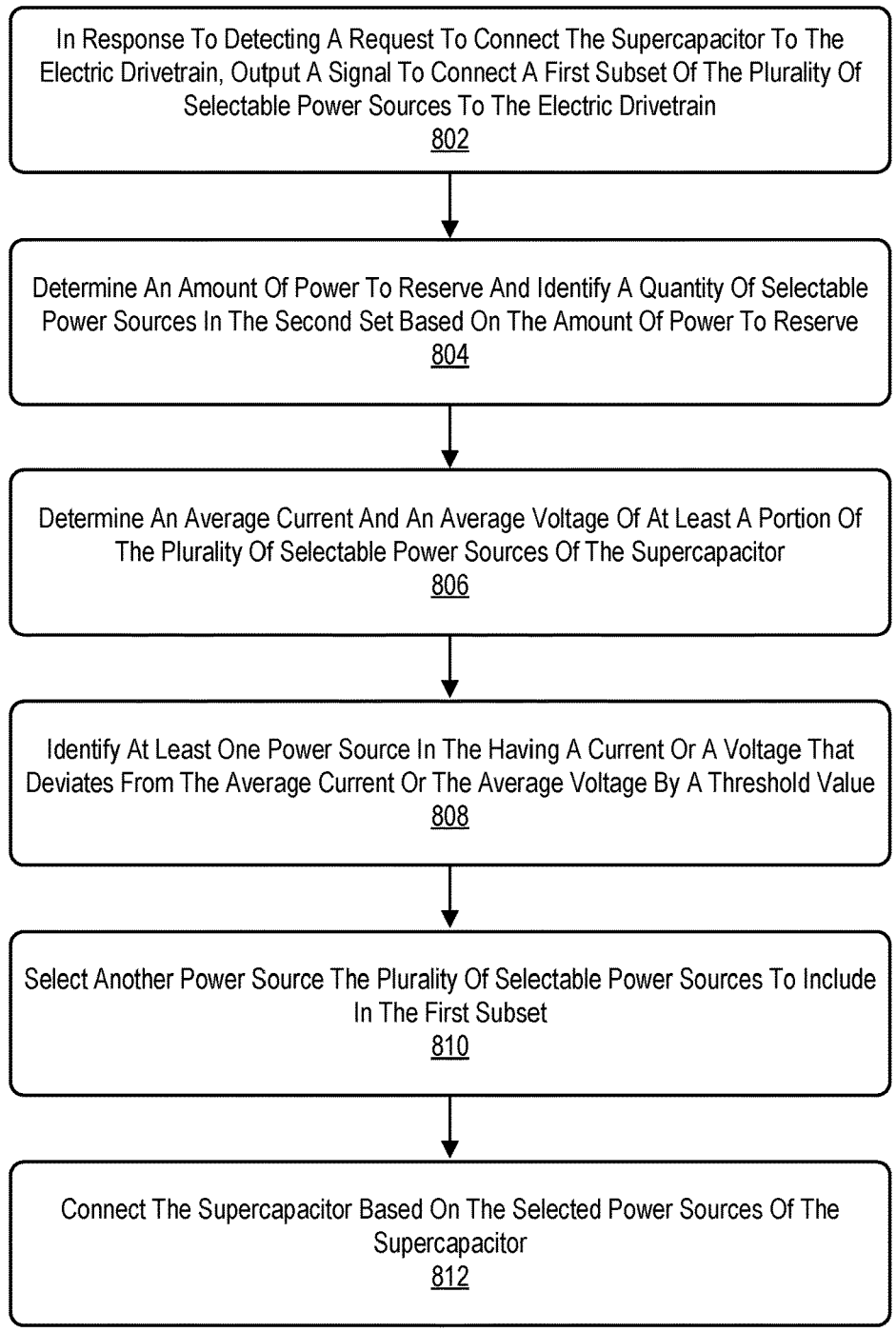
FIG. 8 is a flow diagram illustrating a process for energy management based on selectable power sources in a supercapacitor, according to some examples.

FIG. 8 is a flow diagram illustrating a process 800 for energy management by an energy management system included in, for example, a vehicle or other system that may have a heterogenous battery system. The process 800 may be performed by, for example, the energy management system 100 to manage power deliver of the EC battery 102 and the SC batteries 112.

At block 802, the energy management system may, in response to detecting a request to connect the supercapacitor to the electric drivetrain, output a signal to connect a first subset of the plurality of selectable power sources to the electric drivetrain. In some aspects, the switch and test module 106 and/or the controller 110 can receive the signal to perform various functions described above.

At block 804, as part of connecting the request to connect the supercapacitor, the energy management system may determine an amount of power to reserve and identify a quantity of selectable power sources in the second set based on the amount of power to reserve. In some cases, the amount of power to reserve is a fixed value, for example 20% of the total capacity at a specific point in time (e.g., manufacturing), or may be dynamic, such as a value determined based on recent usage of the system. In one example, the value may be based on the current lifespan of the EC battery. For example, if the EC battery has undergone 500 discharges and charging capacity is at 70% of initial changes, the reserved (or hold out) power may be increased.

At block 806, the energy management system may determine an average current and an average voltage of at least a portion of the plurality of selectable power sources of the supercapacitor. For example, each of the selectable power sources 711-744 is measured for voltage and/or current. In some cases, the energy management system may determine usage statistics and/or lifespan information related to each of the selectable power sources 711-744. As noted above, the energy management system may prioritize reserving current in selectable power sources 711-744 to maximize charging and discharging cycles.

At block 808, the energy management system may identify at least one power source in the having a current or a voltage that deviates from the average current or the average voltage by a threshold value. For example, if a selectable power source has a voltage or current of less than 5% from the average of the selectable power sources 711-744, the energy management system may deem this particular selectable power source to be reserved to prevent charge/discharge cycles. In this case, the energy management system dynamically builds a schedule to use the selectable power sources 711-744 in a manner to maximize charging and discharging cycles.

At block 810, the energy management system may select another power source the plurality of selectable power sources to include in the first subset. For example, the energy management system may select a selectable power source that has been in the queue the longest. Other types of management are possible, such as selecting the selectable power sources in the inactive set based on the maximum voltage and/or current.

At block 812, the energy management system may then connect the supercapacitor based on the selected power sources of the supercapacitor. For example, in the case of sixteen selectable power sources, the energy management system may connect thirteen of sixteen of the selectable power sources, thereby reserving 18.75% of the ideal power. However, this number may change based on the capacity of the selectable power sources and other factors. In some aspects, the reserved capacity is based on deep learning techniques, a planned destination, and other types of information.

Figure 9:
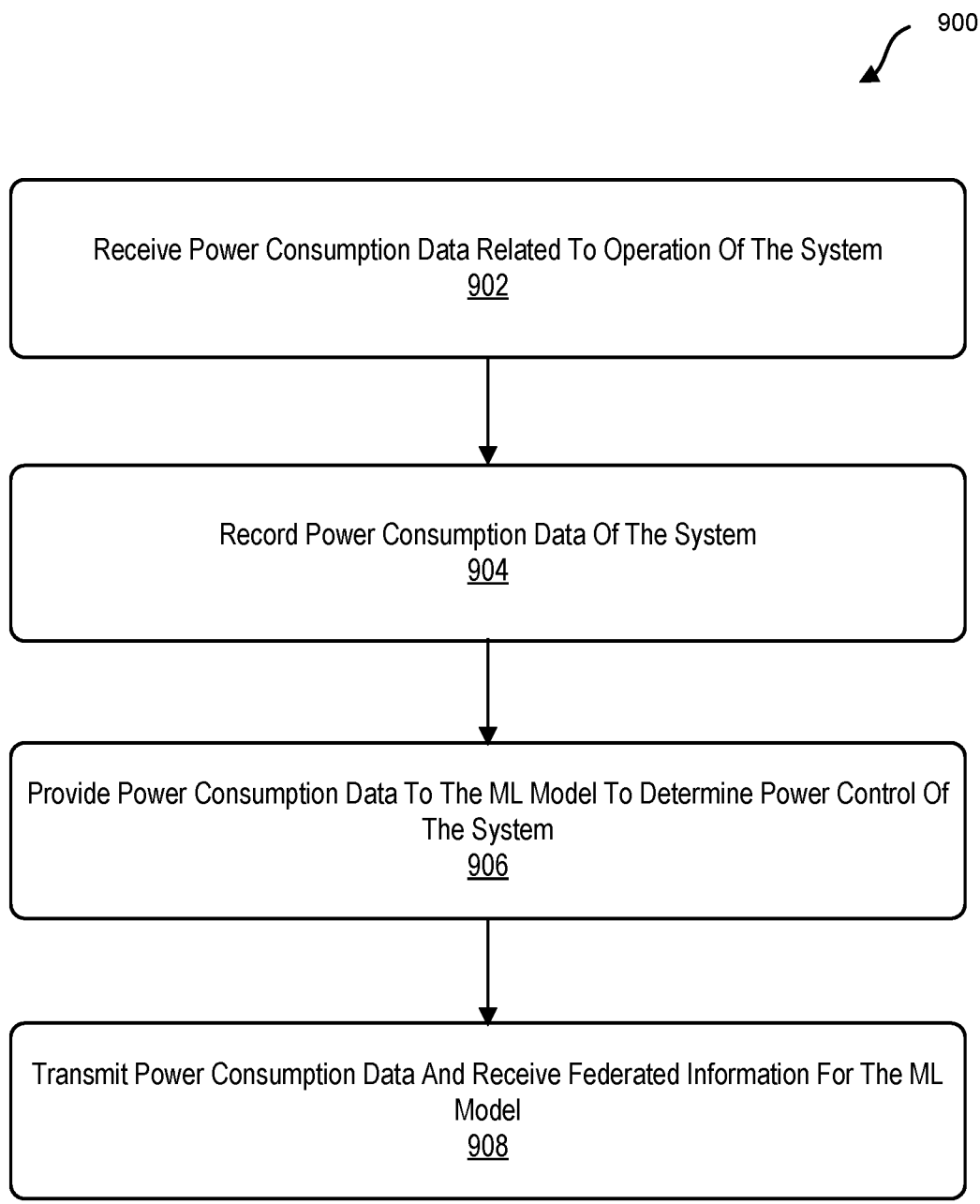
FIG. 9 is a flow diagram illustrating a process for energy management based on machine learning to maximize battery lifecycles, according to some examples

FIG. 9 is a flow diagram illustrating a process 900 for energy management by an energy management system included in, for example, a vehicle or other system that may have a heterogenous battery system. The process 900 may be performed by, for example, the energy management system 100 to manage power deliver of the EC battery 102 and the SC batteries 112.

At block 902, the energy management system may receive power consumption data related to the operation of the system. For example, the switch and test module 106 and the SC controller 116 may be configured to measure voltage and current at different electrical nodes and monitor power consumption based on a variant of factors. In some aspects, block 902 can also include measuring charging information to manage the lifecycle of the EC battery 102 and the SC batteries 112.

At block 904, the energy management system may be configured to record power consumption data of the system. In some aspects, the energy management system can also record the charging information.

At block 906, the energy management system may, during operation of the system, provide current power consumption data to a machine learning (ML) model to determine power control of the system. For example, the ML model may identify that the EC battery is being used and, based on its charging/discharging lifecycles, determine that the SC battery should be connected because the amount of current presently required would adversely affect the life of the EC battery. In other case, the energy management system may determine that, based on an external or internal temperature, the SC battery should be connected due to weather conditions. The ML model can use different aggregated data and identify an optimal power delivery scenario to maximize the lifecycle and charge of the EC battery and the SC battery.

At block 908, the energy management system may be configured to transmit power consumption data to an external system and, in some cases, receive federal information for the ML model. In this case, the energy management system can implement a federated learning system that can train and build ML models that are frequently updated based on different factors. For example, ML models associated with a cold mountainous region will be different that temperate and flat regions based on. The external system anonymizes usage data and can build different ML models based on system usage to extend the lifecycle of the EC and SC battery.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc. When a process corresponds to a function, its termination can correspond to a return of the function to the calling function or the main function.

Aspects of the present disclosure may be provided as a computer program product, which may include a computer-readable medium tangibly embodying thereon instructions, which may be used to program a computer (or other electronic devices) to perform a process. The computer-readable medium may include, but is not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other types of media/machine-readable medium suitable for storing electronic instructions (e.g., computer programming code, such as software or firmware). Moreover, aspects of the present disclosure may also be downloaded as one or more computer program products, wherein the program may be transferred from a remote computer to a requesting computer by way of data signals embodied in a carrier wave or other propagation medium via a communication link (e.g., a modem or network connection).

What is claimed is:

1. A vehicle power management system comprising:
a plurality of energy storage units including a supercapacitor and an electrochemical battery, the supercapacitor comprising a plurality of selectable power sources; and
a processor that executes instructions stored in memory, wherein the processor executes the instructions to:
detect a request to connect the supercapacitor or the electrochemical battery to an electric drivetrain of a vehicle, and
selectively connect the supercapacitor or the electrochemical battery to the electric drivetrain of the vehicle in accordance with the request, wherein connecting the supercapacitor to the electric drivetrain includes outputting a signal regarding connecting a first set of the plurality of selectable power sources to the electric drivetrain.

2. The vehicle power management system of claim 1, wherein the processor selectively connects the supercapacitor to the electric drivetrain by toggling a switch under control of an energy controller, the switch toggling between different configurations associated with the supercapacitor and the electrochemical battery.

3. The vehicle power management system of claim 1, wherein a second set of the plurality of selectable power sources remains disconnected from the electric drivetrain.

4. The vehicle power management system of claim 3, wherein the processor executes further instructions to:
determine an amount of power to reserve; and
identify a quantity of selectable power sources in the second set to remain disconnected based on the amount of power to reserve.

5. The vehicle power management system of claim 1, wherein a quantity of selectable power sources in the first set is based on a reserved amount of power.

6. The vehicle power management system of claim 1, wherein the processor executes further instructions to, measure each selectable power source of the plurality of selectable power sources of the supercapacitor.

7. The vehicle power management system of claim 6, wherein the processor executes further instructions to:
determine an average current and an average voltage of at least a portion of the plurality of selectable power sources of the supercapacitor; and
identify at least one of the selectable power sources as having a current or a voltage that deviates from the average current or the average voltage by a threshold value.

8. The vehicle power management system of claim 7, wherein the processor executes further instructions to select another power source from the plurality of selectable power sources to include in the first set based on the identified deviation.

9. The vehicle power management system of claim 8, wherein the processor executes further instructions to:
remove the selected power source from a second set,
add the selected power source to the first set, and
add the at least one power source to the second set.

10. The vehicle power management system of claim 8, wherein the processor selects the selected power source based on a schedule to preserve battery life of the plurality of selectable power sources.

11. The vehicle power management system of claim 1, wherein the processor executes further instructions to:
detect that an average voltage or average current of the first set is less than a threshold; and
output a signal to connect the electrochemical battery to the electric drivetrain.

12. The vehicle power management system of claim 11, wherein the processor detects the average current of the first set based on a number of charge or number of discharge cycles of the electrochemical battery.

13. The vehicle power management system of claim 1, further comprising a crossbar switch connected to each of the plurality of selectable power sources of the supercapacitor.

14. The vehicle power management system of claim 1, wherein the processor executes further instructions to determine that a current threshold of the electrochemical battery is exceeded by a requested current, wherein the processor outputs the signal to connect the supercapacitor to the electric drivetrain based on the determination.

15. The vehicle power management system of claim 14, wherein the processor determines the current threshold based on a number of charge or discharge cycles of the electrochemical battery.

16. The vehicle power management system of claim 1, wherein the processor executes further instructions to determine that a voltage and current combination requirement cannot be provided by the electrochemical battery, wherein the processor outputs the signal to connect the supercapacitor to the electric drivetrain based on the determination.

17. The vehicle power management system of claim 1, further comprising a communication interface that:
transmits recorded information regarding power draw from the electrochemical battery and the supercapacitor; and
receives shared weights for a machine learning model that is trained at least in part based on the recorded information, wherein the processor executes the machine learning model based on the recorded information and the shared weights to selectively output a signal to connect the supercapacitor or the electrochemical battery to the electric drivetrain to propel the vehicle.

18. The vehicle power management system of claim 1, wherein the processor further executes a machine learning model based on recorded information and predetermined weights to selectively output a signal to connect the supercapacitor or the electrochemical battery to the electric drivetrain.

19. The vehicle power management system of claim 18, wherein the processor executes further instructions to train the machine learning model to predict a change in future power draw based on a set of inputs.

20. The vehicle power management system of claim 19, wherein the processor trains the machine learning model based on inputs that include recorded information and predetermined weights.

* * * * *